(12) United States Patent
Tafoya

(10) Patent No.: US 10,260,836 B1
(45) Date of Patent: *Apr. 16, 2019

(54) ARCHERY TRAINING SYSTEM

(71) Applicant: Justin D. Tafoya, Lakeside, AZ (US)

(72) Inventor: Justin D. Tafoya, Lakeside, AZ (US)

(*) Notice: Subject to any disclaimer, the term of this patent is extended or adjusted under 35 U.S.C. 154(b) by 67 days.

This patent is subject to a terminal disclaimer.

(21) Appl. No.: 15/495,754

(22) Filed: Apr. 24, 2017

Related U.S. Application Data

(63) Continuation of application No. 14/732,726, filed on Jun. 6, 2015, now Pat. No. 9,633,573.

(51) Int. Cl.
*A63B 69/00* (2006.01)
*F41B 5/14* (2006.01)
*G09B 19/00* (2006.01)

(52) U.S. Cl.
CPC ............ *F41B 5/1476* (2013.01); *A63B 69/00* (2013.01); *F41B 5/1469* (2013.01); *G09B 19/0038* (2013.01); *A63B 2244/04* (2013.01)

(58) Field of Classification Search
USPC ......... 434/247; 124/23.1, 24.1, 86; 482/122, 482/126
See application file for complete search history.

(56) References Cited

U.S. PATENT DOCUMENTS

| | | | |
|---|---|---|---|
| 4,279,601 A | 7/1981 | Cobelli |
| 4,297,601 A | 10/1981 | Wada et al. |
| 4,328,965 A | 5/1982 | Hatfield |
| 4,609,191 A | 9/1986 | Remme |
| 4,708,341 A | 11/1987 | Paraskevakos |
| 4,741,528 A | 5/1988 | Church |
| 5,163,413 A | 11/1992 | Carella |
| 5,277,170 A | 1/1994 | Carella |
| 5,592,928 A | 1/1997 | Frasier |
| 6,425,765 B1 | 7/2002 | Irwin, III |
| 7,708,674 B1 | 5/2010 | Saunders |
| 8,079,942 B2 | 12/2011 | Anderson |
| 2004/0014010 A1 | 1/2004 | Swensen |
| 2014/0113779 A1 | 4/2014 | Loach |

(Continued)

FOREIGN PATENT DOCUMENTS

| | | |
|---|---|---|
| JP | 3096226 B2 | 10/2000 |
| JP | 3096376 B2 | 10/2000 |

OTHER PUBLICATIONS

Master Coach Bernie Pellerite, "Bernie's PanicMaster Bow Simulator Instruction Manual", Robinhood Video Productions, Inc., www.robinhoodvideos.com, 2011.

(Continued)

*Primary Examiner* — Kurt Fernstrom
(74) *Attorney, Agent, or Firm* — Booth Udall Fuller, PLC

(57) ABSTRACT

An archery training system provides an archer the ability to safely condition psychologically and physically without the need of a bow and arrow while maintaining the sensation of using a bow and arrow. The archery training system is easily portable or stowed, and offers a combination of variables replicating the activity of compound and traditional bow shooting, such as a counter balanced replication of a grasped bow while drawing a bowstring, an archery release aid configured to mimic the finger positioning of a traditional bow, the utilization of accessory bow sights for target acquisition and aiming, the adjustability to accommodate the various hand grip styles unique to each archer, and immediate visual feedback to performance or shooting technique.

20 Claims, 21 Drawing Sheets

(56) References Cited

U.S. PATENT DOCUMENTS

2015/0300769 A1    10/2015   Heisser
2017/0023327 A1    1/2017   Pell
2017/0167823 A1    6/2017   Kirilov et al.

OTHER PUBLICATIONS

Techniq—Hoyt Archery Training Device <https://www.behance.net/gallery/7415129/Techniq-Hoyt-Archery-Training-Device>.
Releasing for Increased Accuracy with Back Tension <http://www.bowhunting.net/2012/02/releasing-for-increased-accuracy-with-back-tension/>.
Saunders Archery—Firing-Line™ <http://www.sausa.com/product.php?id=77>.
Wise, L. "How to Introduce Young Shooters" ArrowTrade Magazine, May 2011, pp. 114-121 <http://arrowtrademagazine.com/assets/may2011-startingyouthwithreleaseaids.pdf>.
Miller's Archery Training Device <https://web.archive.org/web/20120222034909/http://bowhunting.net:80/2012/02/releasing-for-increased-accuracy-with-back-tension>.
Techniq Archery Training Device <https://www.behance.net/gallery/7415129/Techniq-Hoyt-Archery-Training-Device>.
Toxoshot Archery Training Bow <http://www.coroflot.com/chrisnewberry/Uni-Derby-Year-3-Major-Project?specialty=4&page_no=4&>.
Abbey Archery <https://www.abbeyarchery.com.au/p/WWWSB/Win+%26amp%3B+Win+Scapower+Stretching+Band.html>.
Hoyt Techniq (Archery Muscle Trainer Design) <http://www.worlddesignconsortium.com/work.php?WORK=103943853>.

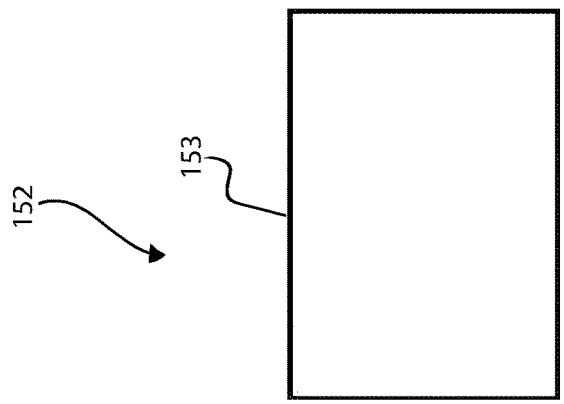
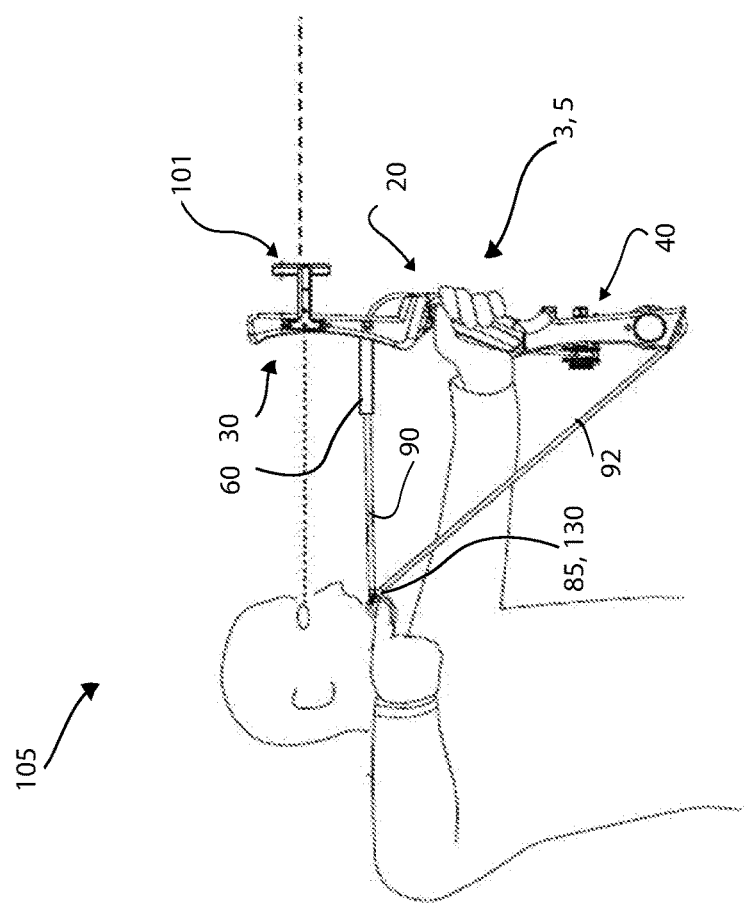
Fig. 13

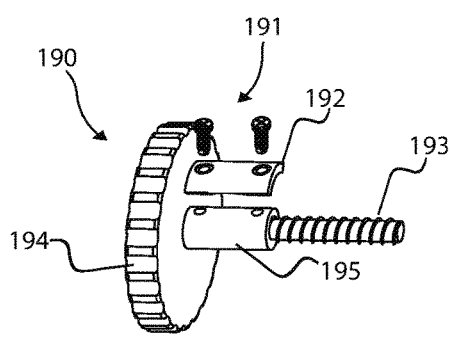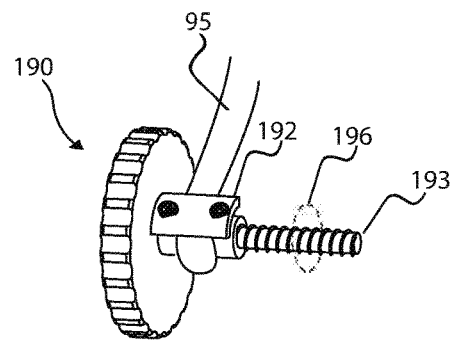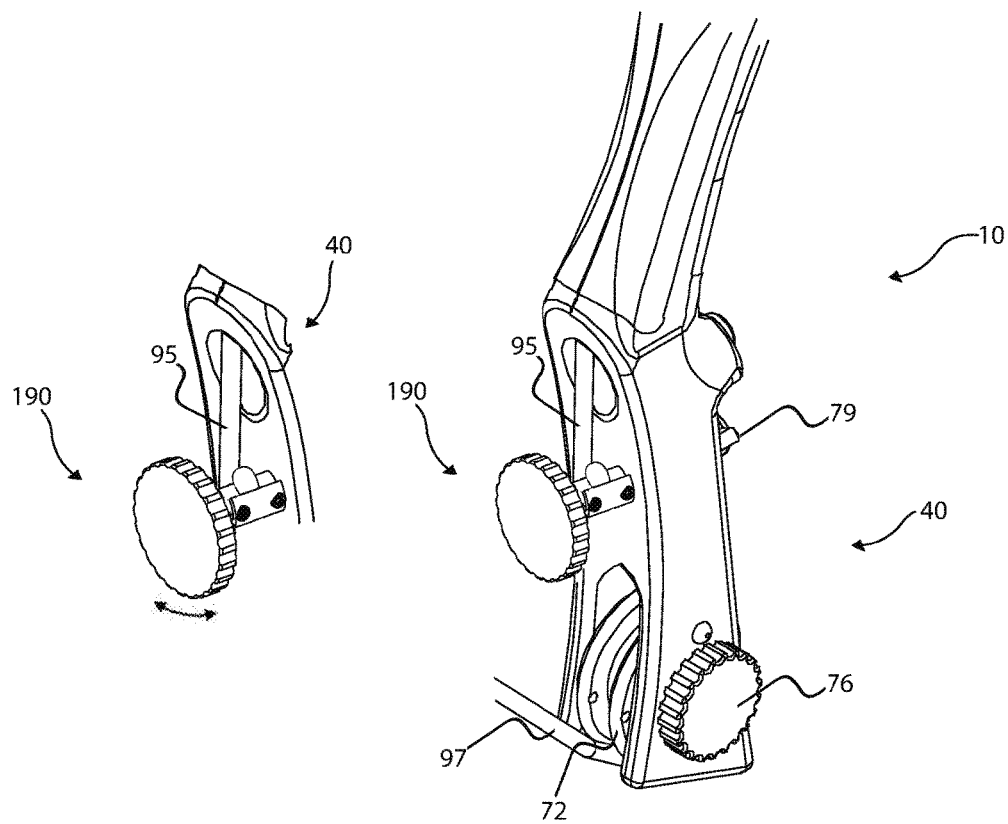

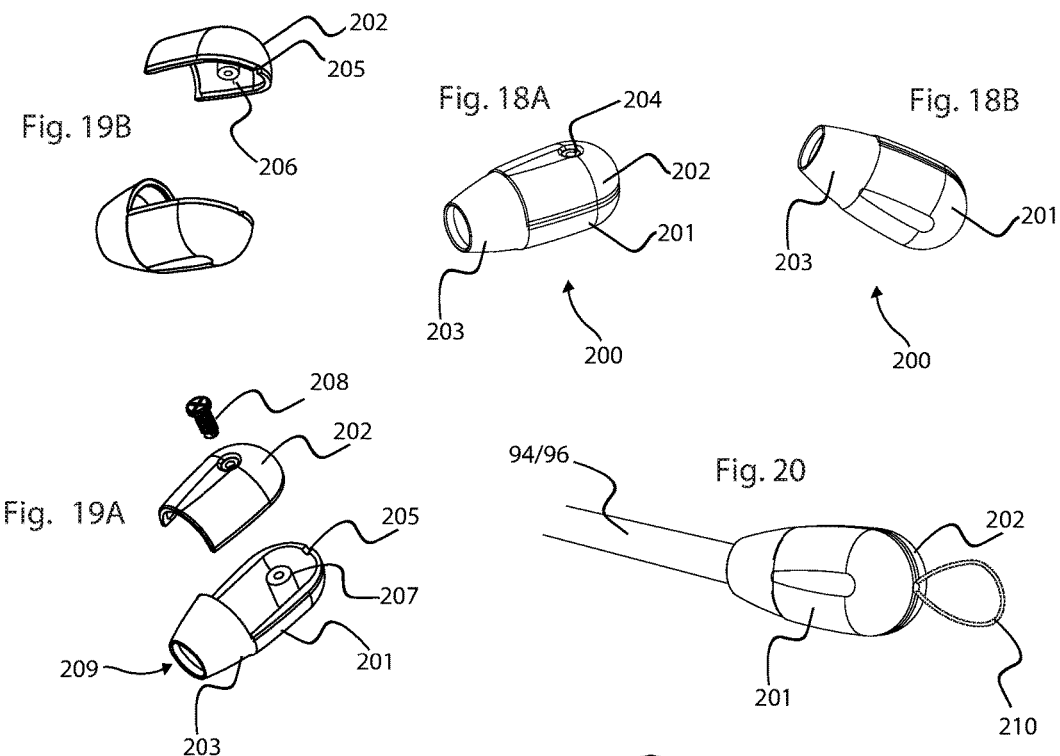
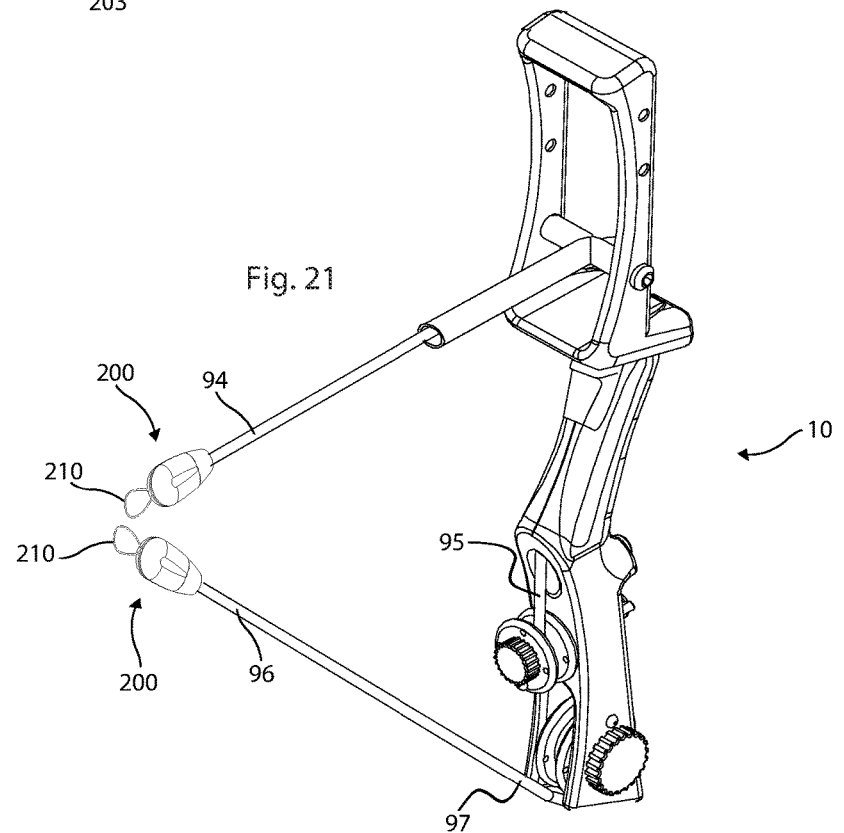

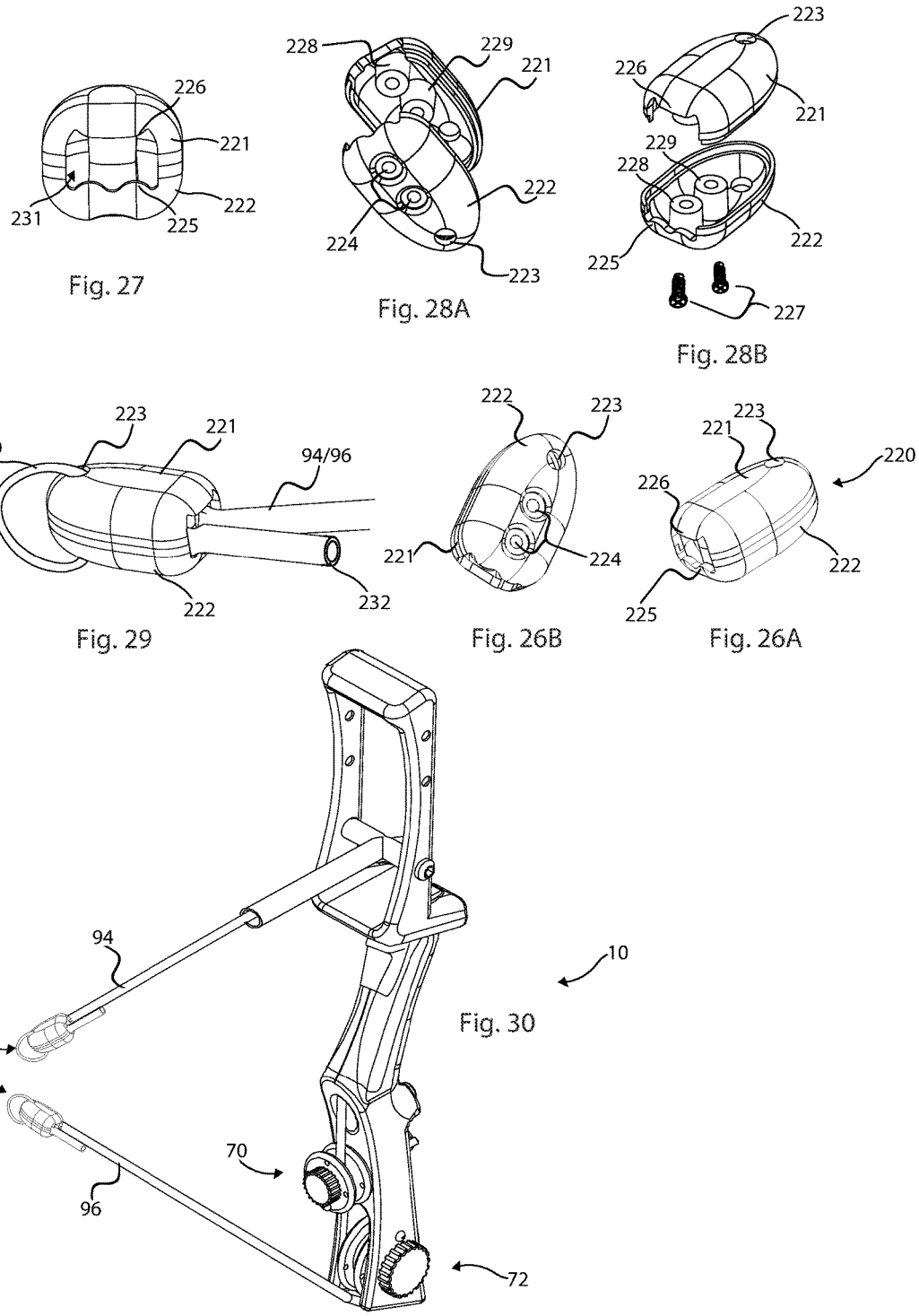

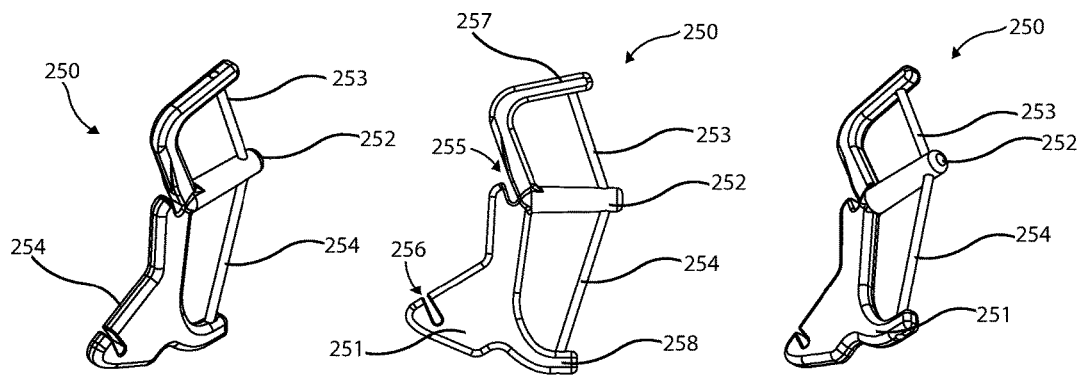
Fig. 32  Fig. 33  Fig. 34
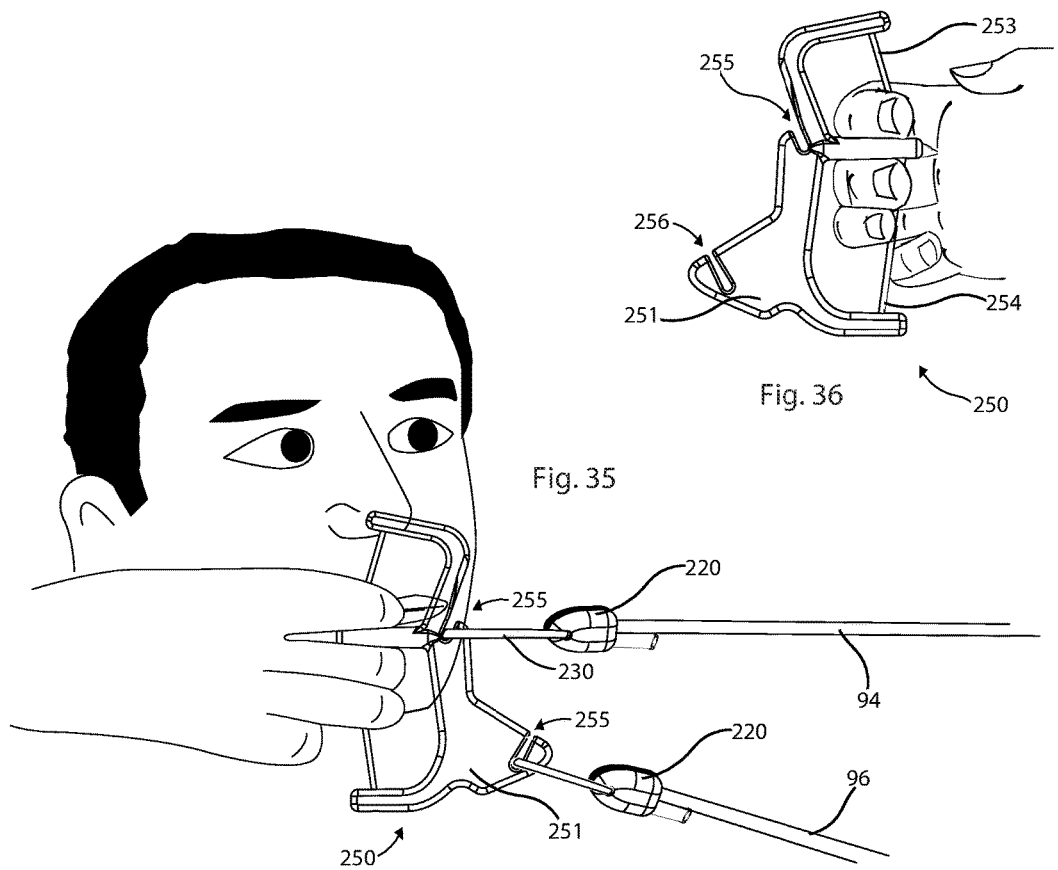
Fig. 36
Fig. 35

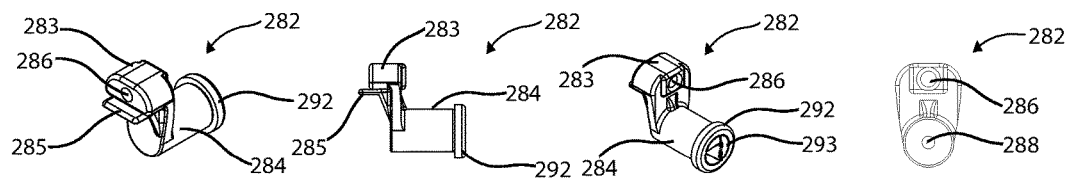
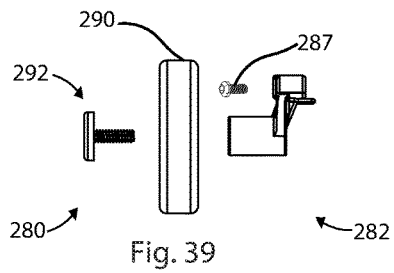
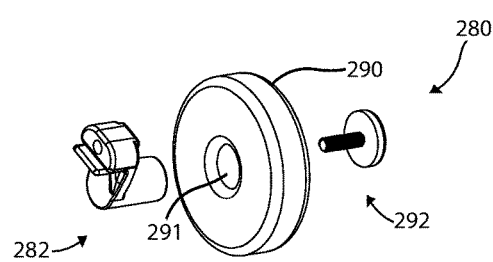
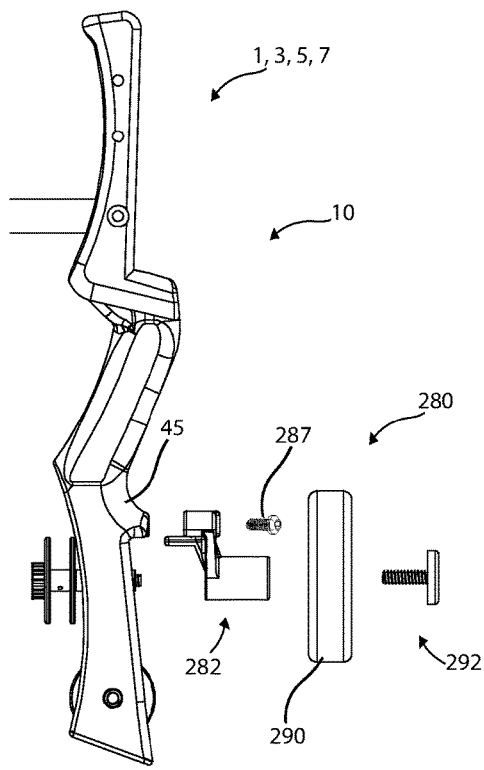
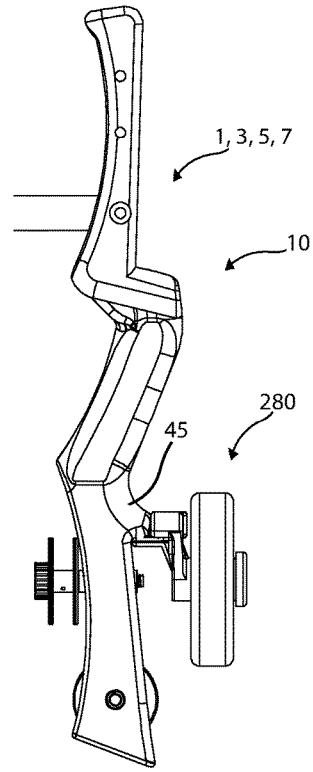

ARCHERY TRAINING SYSTEM

CROSS-REFERENCE TO RELATED APPLICATION

This application is a Continuation of U.S. patent application Ser. No. 14/732,726 to Justin D. Tafoya et al. entitled "MECHANICAL RELEASE ARCHERY TRAINING DEVICE," filed on Jun. 6, 2015, which claims the benefit of the filing date of U.S. Provisional Patent Application 62/009,050 entitled "Mechanical Release Archery Training Device" to Justin D. Tafoya, filed on Jun. 6, 2014, which is hereby incorporated by reference in its entirety.

TECHNICAL FIELD

Aspects of this document relate generally to archery and, more specifically, to an archery training system.

BACKGROUND

In 2012, the Archer Trade Association (ATA) conducted the first nationwide archery survey. The ATA reported that 18.9 million Americans age 18 and older participated in archery and/or bow hunting that year. This number has only increased since then. The New York Times reported in 2008 that 90% of "elite archers" would suffer from target panic at least once in their lifetime. If the 2008 rate of target panic held true for those archers surveyed in 2012 by the ATA, then approximately 17 million of those active archers would suffer from target panic.

Archery, like many sports, requires training of the mind and muscles. Repetitive conditioning of these two characteristics by an archer will facilitate the development of muscle memory, psychological confidence, and the proper body mechanics required to achieve desired arrow placement when shot at a target. Target panic is a psychological condition that causes the archer to prematurely shoot the arrow or actuate the mechanical release aid trigger prior to desired target acquisition, thereby, debilitating the archer from being able accurately and confidently place sight pins on target. There are various recommendations to resolving target panic that require the use of a bow and arrow. However, the recommendations do not alleviate the psychological impairments associated with physically shooting an arrow and risking an undesired flight path of an arrow or missing the target altogether.

Other common problems or challenges archers experience in addition to target panic include "punching" of the mechanical release aid trigger, muscle fatigue, and inadequate personal time to condition mentally and physically. "Punching" of an archer's trigger release aid occurs when the archer is unable to steady the sights pins on target and the archer rapidly triggers the release aid as the desired pin passes through the target. Muscle fatigue is associated with the amount of time an archer is able to dedicate to training in the activity of archery and the availability of training resources.

Archers cannot practice shooting their bow without nocking and then shooting an arrow. If an archer dry fires a compound bow (i.e., shooting the bow without using an arrow), the bow will most likely be damaged or ruined. Dry firing an actual bow creates atypical stresses and often results in breaking or damaging the bow string, cracking or shattering the bows limbs, damaging the cams, or other harm.

Conventional devices exist to try to help archers develop proper shooting form and muscle strength, control and memory. Thus, archers are able to dry fire these devices to practice archery without actually shooting an arrow. However, these devices are lengthy, or they are bulky mechanisms that attach to a bow or have their own handles. Such devices are not easily portable or stowed, and do not offer a combination of variables replicating the activity of compound bow shooting, such as a counter balanced replication of a grasped bow while drawing a bowstring, the utilization of accessory bow sights for target acquisition and aiming, the adjustability to accommodate the various hand grip styles unique to each archer, and immediate visual feedback to performance or shooting technique.

Applicants believe that the material incorporated above is "non-essential" in accordance with 37 CFR § 1.57, because it is referred to for purposes of indicating the background of the disclosure or illustrating the state of the art. However, if the Examiner believes that any of the above-incorporated material constitutes "essential material" within the meaning of 37 CFR § 1.57(c)(1)-(3), applicants will amend the specification to expressly recite the essential material that is incorporated by reference as allowed by the applicable rules.

SUMMARY

Aspects of this document relate generally to an archery training system that provides an archer the ability to safely condition psychologically and physically without the need of a bow and arrow while maintaining the sensation of using a bow and arrow. An archery training system that is easily portable or stowed, and offers a combination of variables replicating the activity of compound and traditional bow shooting, such as a counter balanced replication of a grasped bow while drawing a bowstring, an archery release aid configured to mimic the finger positioning of a traditional bow, the utilization of accessory bow sights for target acquisition and aiming, the adjustability to accommodate the various hand grip styles unique to each archer, and immediate visual feedback to performance or shooting technique.

Aspects and applications of the disclosure are described below with reference to the DRAWINGS and the DETAILED DESCRIPTION. Unless specifically noted, it is intended that the words and phrases in the specification and the claims be given their plain, ordinary, and accustomed meaning to those of ordinary skill in the applicable arts. The inventor is fully aware that he can be his own lexicographer if desired. The inventor expressly elects, as his own lexicographer, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventor's intent and desire that the simple, plain and ordinary meaning to the terms be applied to the interpretation of the specification and claims.

The inventor is also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

For the exemplary purposes of this disclosure, in one aspect a finger release aid for archery shooting training with an archery training device is disclosed that includes: a nock; a top string fixedly attached to the nock at a first portion of the nock; a bottom string fixedly attached to the nock at the first portion of the nock; and an aid body fixedly attached to a second portion of the nock. The aid body may include a top arm extending from the aid body and fixedly attached to the top string, a bottom arm extending from the aid body and fixedly attached to the bottom string, a top slit located proximate to the second portion of the nock, and a bottom slit located proximate to the bottom arm. When a user dry fires the archery training device, the top slit is configured to releasably couple with a top interconnector of the archery training device, and the bottom slit is configured to releasably couple with a bottom interconnector of the archery training device.

The top string may be attached to the nock at a first angle equal to 90° minus an angle theta between the top string and a y-axis that is in a plane formed by the top string and the nock and is perpendicular to the nock, the bottom string may be attached to the nock at a second angle equal to 90° minus an angle phi between the bottom string and the y-axis, the bottom slit may have a depth forming an angle omega with the y-axis, the angle theta may be in a range of at least one of 5° to 40°, 17° to 33°, 17° to 23°, and 19° to 21°, the angle phi may be in a range of at least one of 5° to 40°, 13° to 27°, 13° to 19°, and 15° to 17°, and the angle omega may be in a range of at least one of 40° to 70°, 50° to 60°, and 53° to 57°.

The angle theta may be approximately 20°, the angle phi may be approximately 16°, and the angle omega may be approximately 55°.

The top string may be attached to the nock at a first angle equal to 90° minus an angle theta between the top string and a y-axis that is in a plane formed by the top string and the nock and is perpendicular to the nock, the bottom string may be attached to the nock at a second angle equal to 90° minus an angle phi between the bottom string and the y-axis, and the angle theta and the angle phi may correspond to a draw length of the user such that at least one of the angle theta and the angle phi increases when the draw length increases.

The top slit may be configured to release the top interconnector and the bottom slit may be configured to couple with the bottom interconnector when the user tilts the finger release aid at an angle exceeding a range.

The top string and the bottom string may each have a length approximately the same as or larger than a width of a finger of the user.

The top string and the bottom string may be one continual string.

For the exemplary purposes of this disclosure, in another aspect a finger release aid for archery shooting training with an archery training device is disclosed that includes: a nock; a top string fixedly attached to the nock at a first portion of the nock, a bottom string fixedly attached to the nock at the first portion of the nock; and an aid body fixedly attached to a second portion of the nock. The aid body may include a top arm extending from the aid body and fixedly attached to the top string, a bottom arm extending from the aid body and fixedly attached to the bottom string, a top slit located proximate to the first portion of the nock, and a bottom slit located proximate to the bottom arm. When a user dry fires the archery training device, the top slit is configured to releasably couple through a top interconnector of the archery training device with a top resistance band of the archery training device that provides a primary tension, and the bottom slit is configured to releasably couple through a bottom interconnector of the archery training device with a bottom resistance band of the archery training device that provides a counterbalance tension to the primary tension.

The top string may be attached to the nock at a first angle equal to 90° minus an angle theta between the top string and a y-axis that is in a plane formed by the top string and the nock and is perpendicular to the nock, the bottom string may be attached to the nock at a second angle equal to 90° minus an angle phi between the bottom string and the y-axis, the bottom slit may have a depth forming an angle omega with the y-axis, the angle theta may be in a range of at least one of 5° to 40°, 17° to 33°, 17° to 23°, and 19° to 21°, the angle phi may be in a range of at least one of 5° to 40°, 13° to 27°, 13° to 19°, and 15° to 17°, and the angle omega may be in a range of at least one of 40° to 70°, 50° to 60°, and 53° to 57°.

The top string may be attached to the nock at a first angle equal to 90° minus an angle theta between the top string and a y-axis that is in a plane formed by the top string and the nock and is perpendicular to the nock, the bottom string may be attached to the nock at a second angle equal to 90° minus an angle phi between the bottom string and the y-axis, and the angle theta and the angle phi may correspond to a draw length of the user such that at least one of the angle theta and the angle phi increases when the draw length increases.

The top slit may be configured to release the top interconnector and the bottom slit may be configured to couple with the bottom interconnector when the user tilts the finger release aid at an angle exceeding a range.

The top string and the bottom string may each have a length approximately the same as or larger than a width of a finger of the user.

The top string and the bottom string may be one continual string.

For the exemplary purposes of this disclosure, in still another aspect a finger release aid for archery shooting training with an archery training device is disclosed that includes: a nock having a first portion and a second portion distal to the first portion; a top string having a first portion and a second portion distal to the first portion and fixedly attached to the second portion of the nock at the second portion of the top string; a bottom string having a first portion and a second portion distal to the first portion and fixedly attached to the second portion of the nock at the second portion of the bottom string; and an aid body fixedly attached to the first portion of the nock. The aid body may include a top arm extending from the aid body in a first direction and turning in a second direction and fixedly attached to the first portion of the top string at a distal end of the top arm, a bottom arm extending from the aid body opposite the first direction and turning in the second direction and fixedly attached to the first portion of the bottom string at a distal end of the bottom arm, a top slit located proximate to the first portion of the nock, and a bottom slit located proximate to the bottom arm. When a user dry fires the archery training device, the top slit may be configured to releasably couple through a top interconnector of the archery training device with a top resistance band of the archery training device that provides a primary tension, and the bottom slit may be configured to releasably couple through a bottom interconnector of the archery training device with a bottom resistance band of the archery training device that provides a counterbalance tension to the primary tension.

The top string may be attached to the nock at a first angle equal to 90° minus angle theta between the top string and a y-axis that is in a plane formed by the top string and the nock and is perpendicular to the nock, the bottom string may be attached to the nock at a second angle equal to 90° minus an angle phi between the bottom string and the y-axis, the bottom slit may have a depth forming an angle omega with the y-axis, the angle theta may be in a range of at least one of 5° to 40°, 17° to 33°, 17° to 23°, and 19° to 21°, the angle phi may be in a range of at least one of 5° to 40°, 13° to 27°, 13° to 19°, and 15° to 17°, and the angle omega may be in a range of at least one of 40° to 70°, 50° to 60°, and 53° to 57°.

The angle theta may be approximately 20°, the angle phi may be approximately 16°, and the angle omega may be approximately 55°.

The top string may be attached to the nock at a first angle equal to 90° minus an angle theta between the top string and a y-axis that is in a plane formed by the top string and the nock and is perpendicular to the nock, the bottom string may be attached to the nock at a second angle equal to 90° minus an angle phi between the bottom string and the y-axis, and the angle theta and the angle phi may correspond to a draw length of the user such that at least one of the angle theta and the angle phi increases when the draw length increases.

The top slit may be configured to release the top interconnector and the bottom slit may be configured to couple with the bottom interconnector when the user tilts the finger release aid at an angle exceeding a range.

The top string and the bottom string may each have a length approximately the same as or bigger than a width of a finger of the user.

The top string and the bottom string may be one continual string.

The foregoing and other aspects, features, and advantages will be apparent to those of ordinary skill in the art from the DETAILED DESCRIPTION, DRAWINGS, and the CLAIMS.

BRIEF DESCRIPTION OF THE DRAWINGS

Implementations will hereinafter be described in conjunction with the following DRAWINGS (which are not necessarily to scale), where like designations denote like elements, and:

FIG. 13 illustrates an archery training system used with an electronic simulator.

FIG. 15 depicts an exploded side perspective view of implementations of a rod tensioner.

FIG. 16 depicts a side perspective view of implementations of a rod tensioner according to the implementations of FIG. 15.

FIG. 17 depicts perspective views of implementations of an archery training system with a rod tensioner according to the implementations of FIG. 15.

FIGS. 18A-20 illustrate various implementations of a fixed interconnector.

FIG. 21 illustrates a rear perspective view of various implementations of an archery training system with fixed interconnectors according to the implementations of FIGS. 18A-20.

FIGS. 26A-29 illustrate various implementations of an adjustable interconnector.

FIG. 30 illustrates a rear perspective view of various implementations of an archery training system with adjustable interconnectors according to the implementations of FIGS. 26-29.

FIGS. 32-37 illustrate various views and implementations of an archery release aid configured to mimic the finger positioning of a traditional bow.

FIG. 38 is a rear perspective exploded view of a stabilizer.

FIG. 39 is a side exploded view of a stabilizer according to the implementations of FIG. 38.

FIG. 40 is a rear perspective view of a stabilizer bracket of a stabilizer according to the implementations of FIG. 38.

FIG. 41 is a side view of a stabilizer bracket according to the implementations of FIG. 40.

FIG. 42 is a front perspective view of a stabilizer bracket according to the implementations of FIG. 40.

FIG. 43 is a front view of a stabilizer bracket according to the implementations of FIG. 40.

FIG. 44 is a side exploded view of a handle structure coupled with a stabilizer according to the implementations of FIG. 38.

FIG. 45 is a side view of a handle structure coupled with a stabilizer according to the implementations of FIG. 38.

DETAILED DESCRIPTION

In the following description, reference is made to the accompanying DRAWINGS which form a part hereof, and which show by way of illustration possible implementations.

Moreover, numerous specific details are set forth below in order to provide a thorough understanding of the various aspects of the disclosure. It will be understood, however, by those skilled in the relevant arts, that the present disclosure may be practiced without these specific details. In other instances, known structures and devices are shown or discussed more generally in order to avoid obscuring the disclosure. In many cases, a description of the operation is sufficient to enable one to implement the various forms of the disclosure. As a matter of convenience, various components will be described using exemplary materials, sizes, shapes, dimensions, and the like. However, this document is not limited to the stated examples and other configurations are possible and within the teachings of the present disclosure.

The disclosed archery training system may assist archers improve shooting technique, improve performance and confidence, build muscle memory and strength, and overcome archery-related psychological impairments like "target panic." The archery training system may come with its own or may include the archer's own mechanical release aid and/or own bow sight attached, which offers the option of safely training "dry fire" archery practice without the need of a bow and arrow. Accordingly, the disclosed archery training system allows archers to practice critical elements of archery without damaging their bows. There are many features of the archery training system and method implementations disclosed herein, of which one, a plurality, or all features or steps may be used in any particular implementation.

Figure 1:
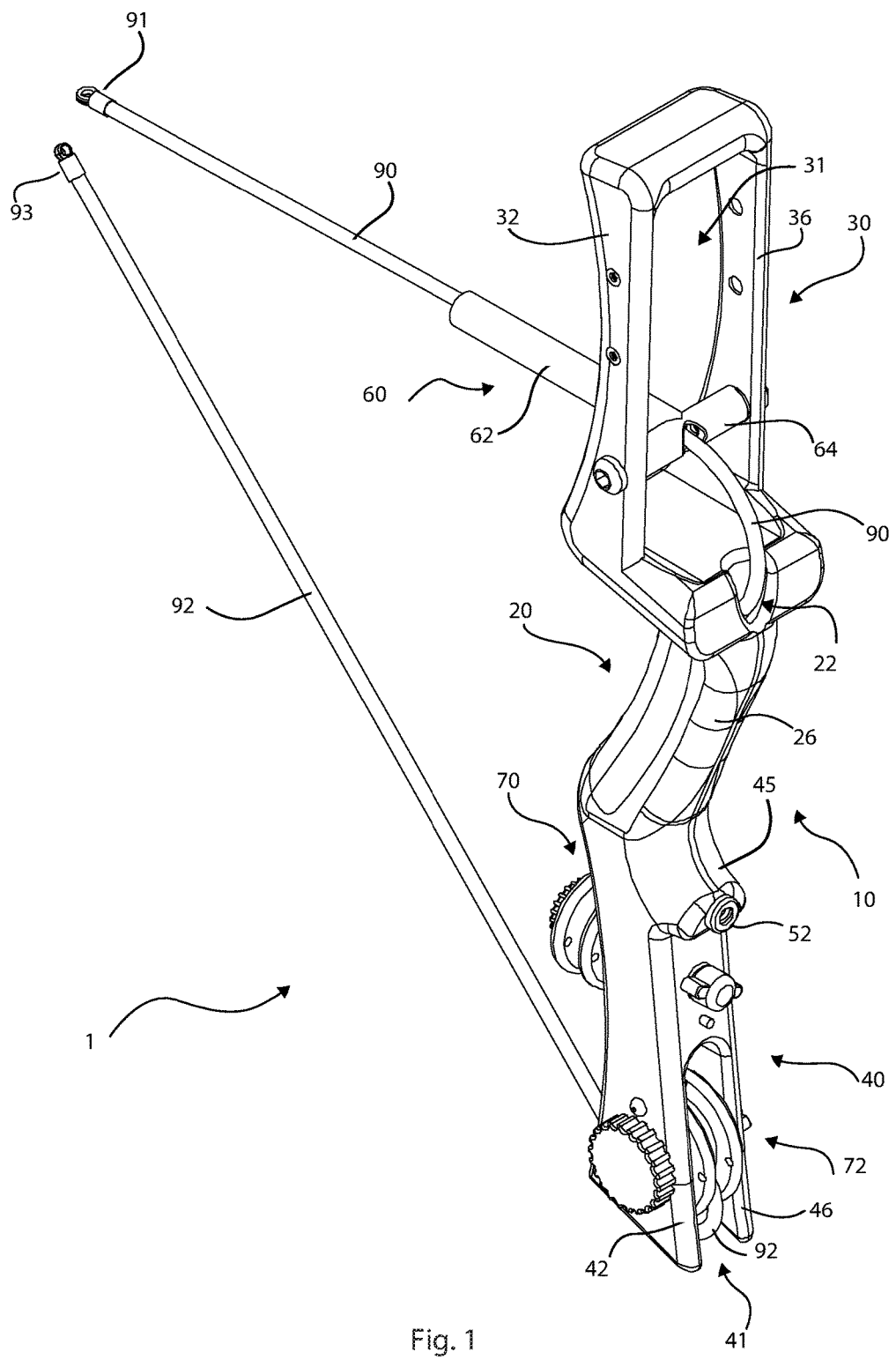
FIG. 1 is a front perspective drawing of an implementation of an archery training system.
Figure 2:
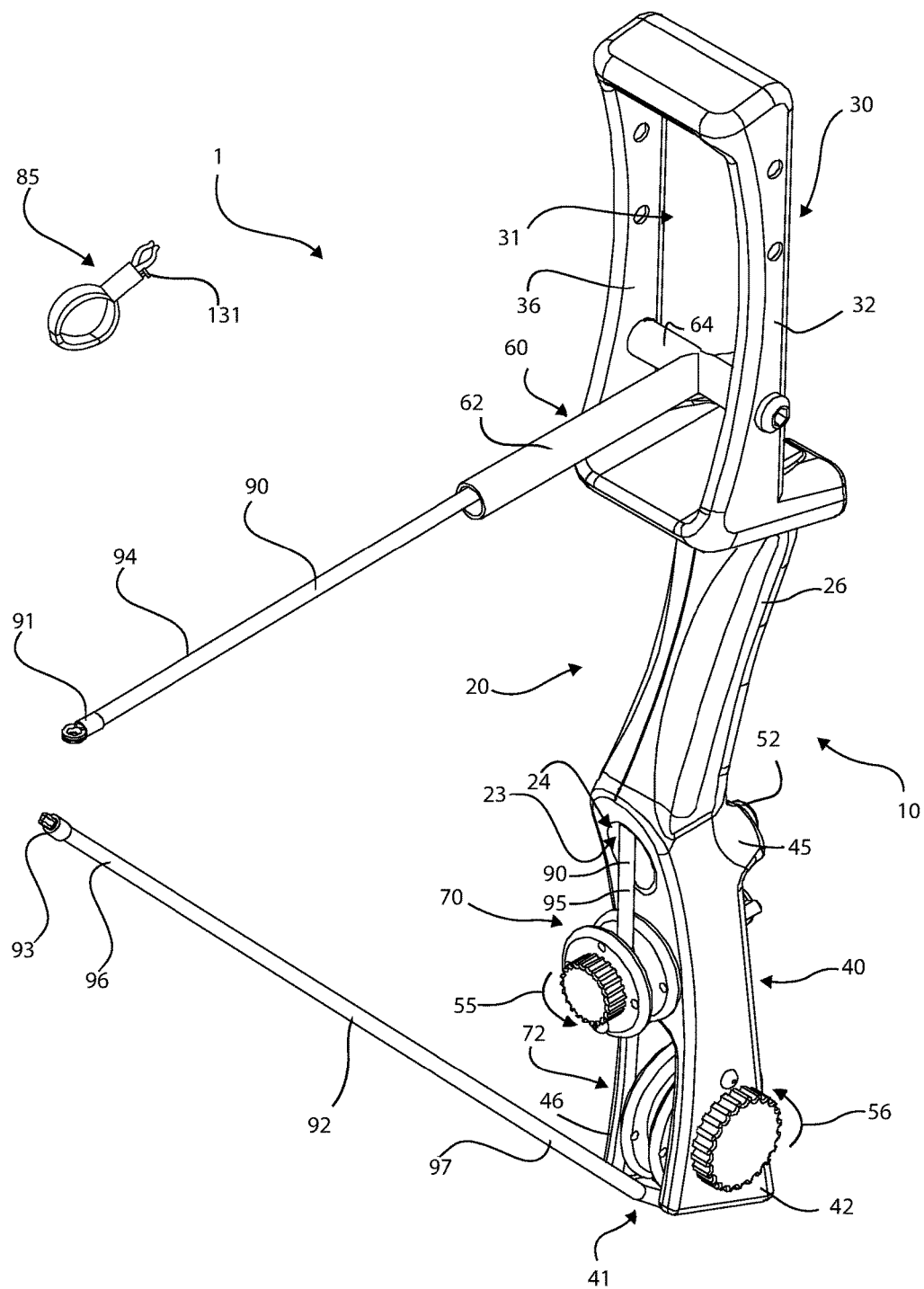
FIG. 2 is a rear perspective drawing of the implementation of FIG. 1.
Figure 3:
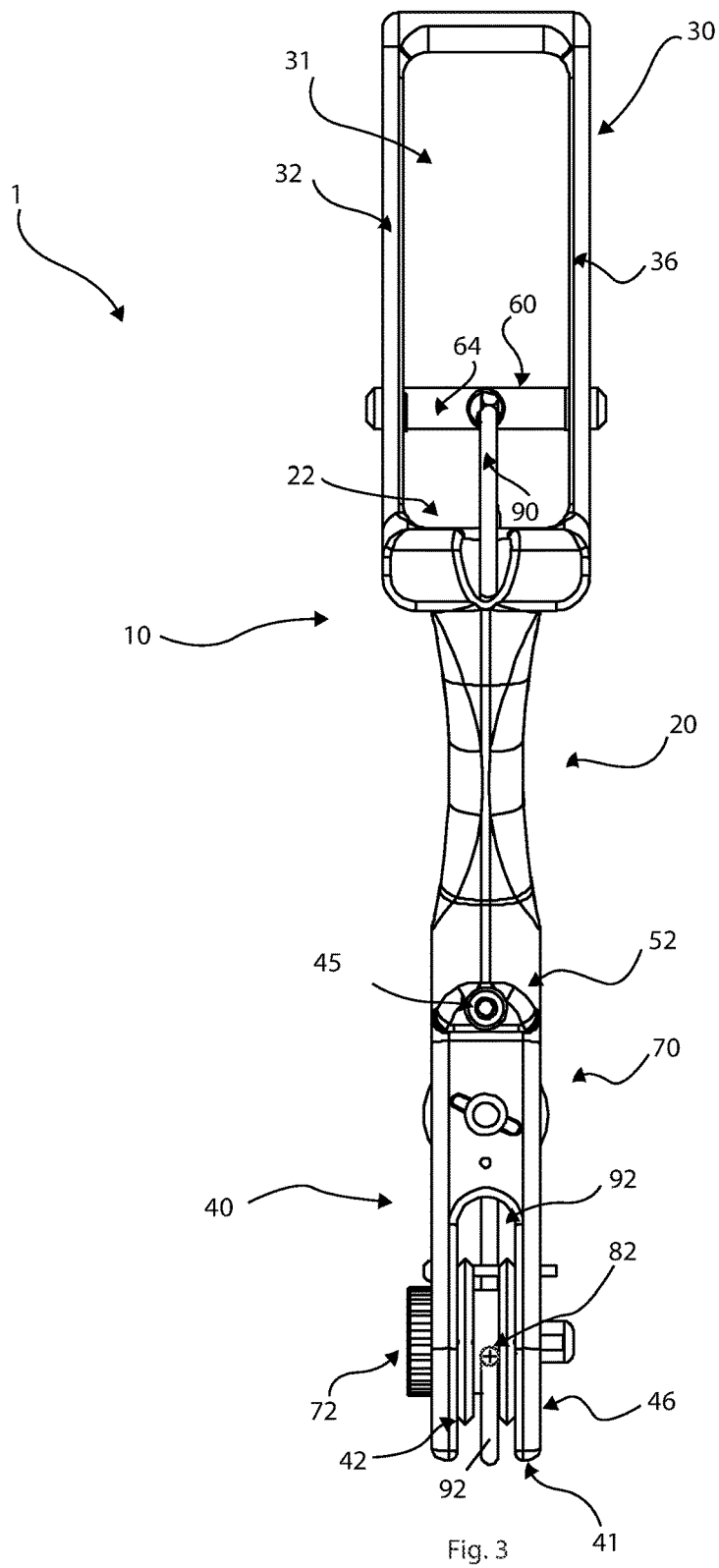
FIGS. 3-3A are front views showing the face of the archery training system according to the implementation in FIG. 1.
Figure 3A:
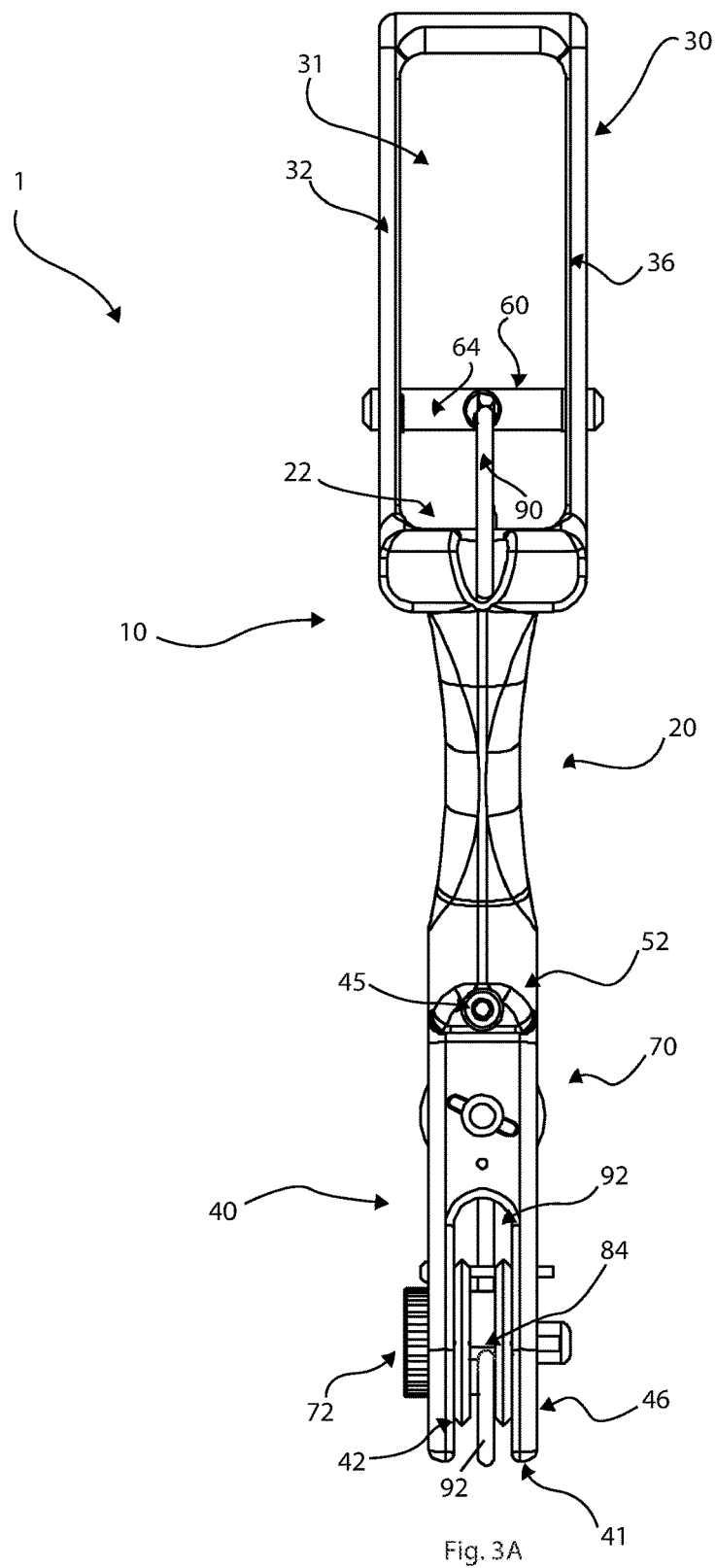
Figure 4:
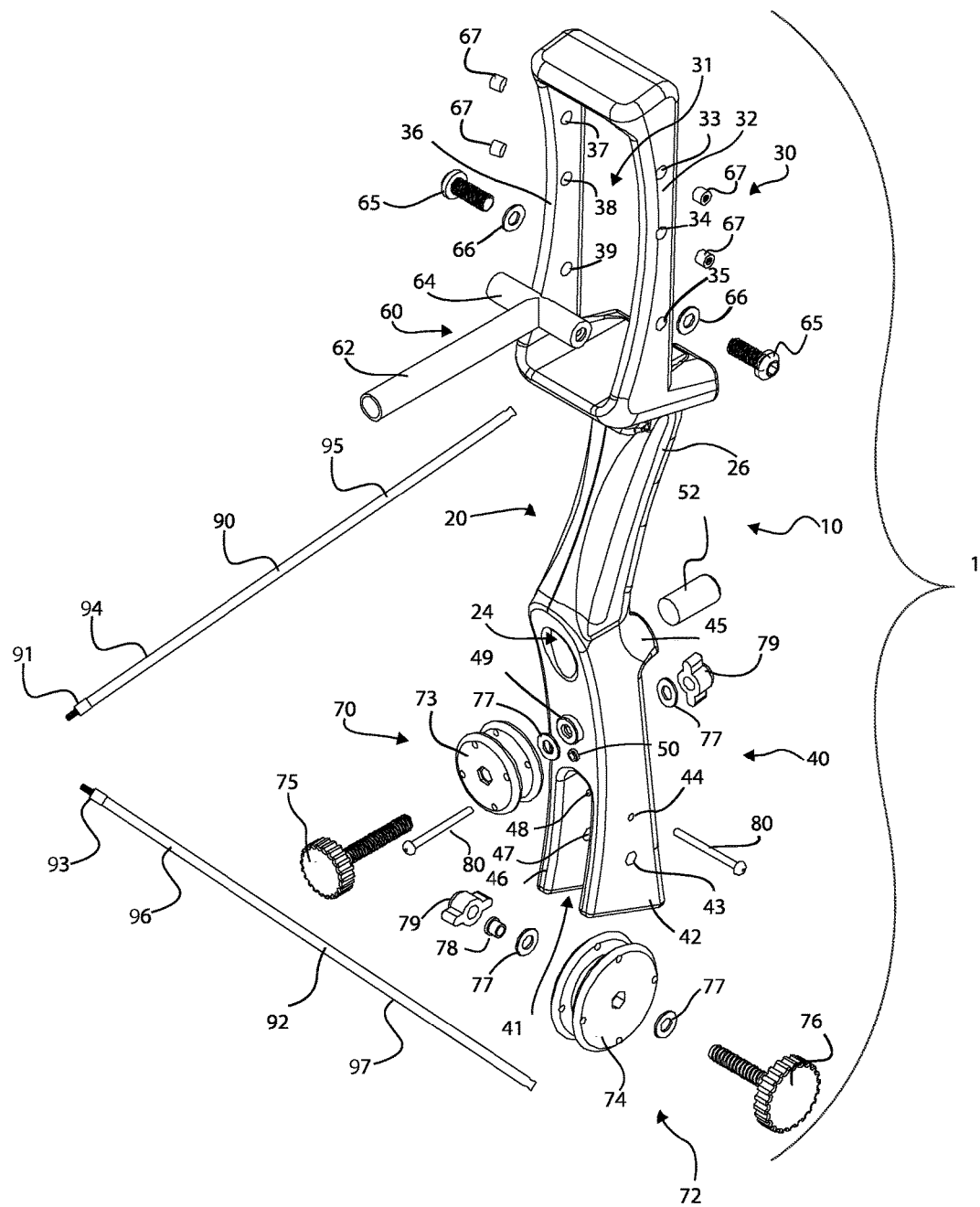
FIG. 4 is a rear perspective exploded view of the implementation of FIG. 1.
Figure 5:
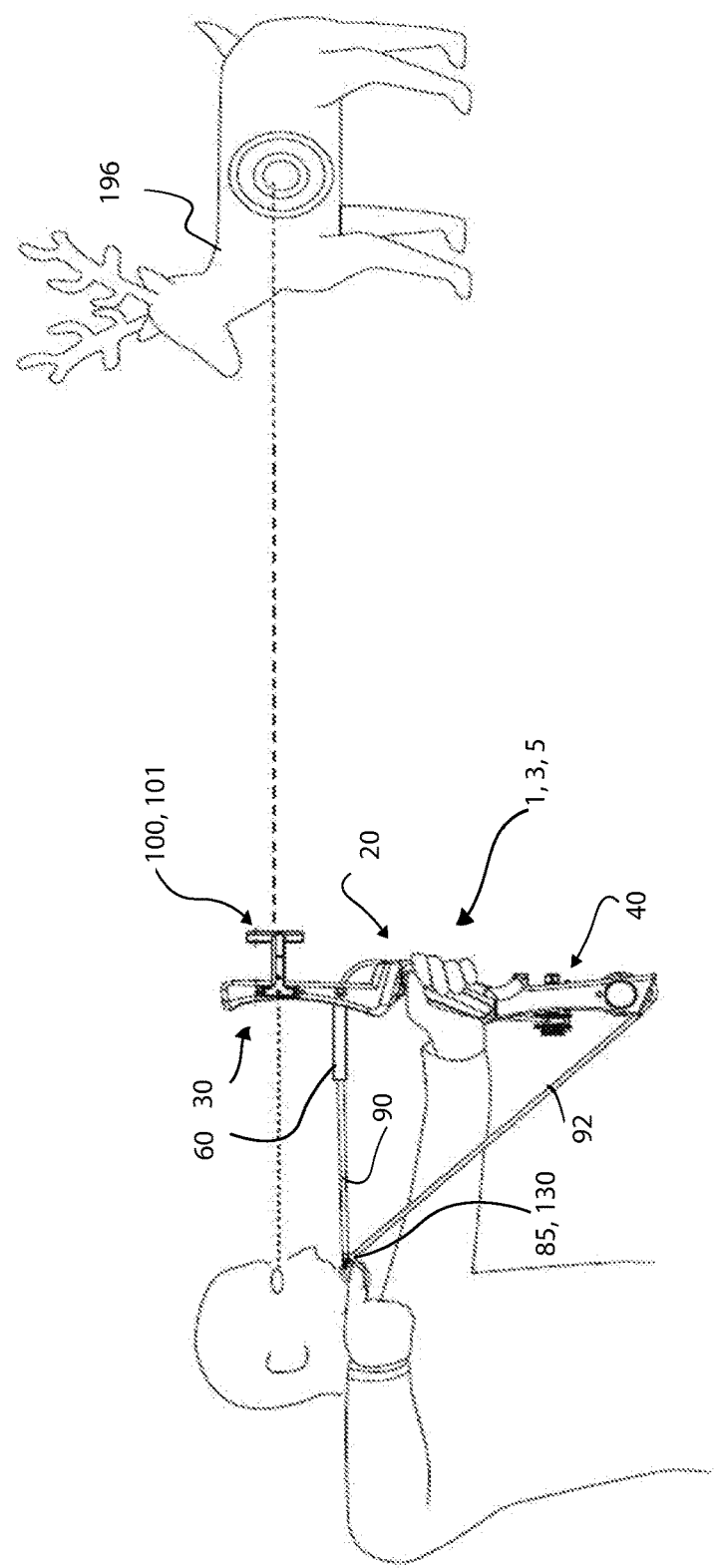
FIG. 5 is a depiction of a user dry firing an archery training system at an actual or virtual target according to the implementations of FIG. 1.

FIGS. 1-5 illustrate an archery training system 1 according to some implementations. FIGS. 1 and 2 are, respectively, front and rear perspective drawings of an implementation of the archery training system 1. FIG. 3 is a front view showing the face of the archery training system 1 and FIG. 4 is a rear perspective exploded view. FIG. 5 is a depiction of an archery training system 1 used with an actual or virtual target. Similarities between the look, weight, balance, response, and feel of the archery training system 1 and actual compound or traditional bows may be intentionally added to help the user more effectively physically and mentally train through dry firing archery training system 1 to become a better archer when using an actual bow and arrow.

Archery training system 1 may include a handle structure 10, top resistance band 90, and optionally a bottom resistance band 92. Handle structure 10 is held by a user at handle 26 in a fashion similar to a compound bow or a traditional bow by having the long axis of the handle structure 10 held approximately orthogonal to the horizon and approximately parallel to the long axis of the user's body. For ease of reference, handle structure 10 is described in terms of three general areas of handle structure 10 that are not necessarily mutually exclusive: the housing unit 30, the handle area 20, and the tensioning area 40.

Archery training system 1 may include the following components: a molded or shaped handle structure 10; a balancer 60 attached to the handle structure 10; a top resistance band 90 with a distal section 94 coupled to a top interconnector 91 and a proximate section 95 that feeds through the balancer 60 entering the rear, exiting the face, feeding through handle structure 10 via top port 22 and bottom port 24 and is secured to the top tensioner 70; a bottom resistance band 92 with a distal section 96 coupled to a bottom interconnector 93 and a proximate section 97 that is secured to the bottom tensioner 72; and a sight window 31 having a right sight post 32 and a left sight post 36 with sight guide holes 33, 34, 37, and 38 and housing sight mount inserts 67, which are available for attaching an archer's bow sight or other sighting device (see, sight 100 of FIG. 5). Either one or both of top interconnector 91 and bottom interconnector 93 may contain a flexible or rigid loop, which may be adapted to be engaged by an archery release aid 85. In some implementations, the handle structure is shaped or curved to mimic the look, feel, or weight of a compound or traditional bow.

The housing unit 30 of handle structure 10 houses the balancer 60 within the sight window 31. The sight window 31 allows the user to view a target in front of the archery training system 1 with or without the aid of a sight 100 attached to the housing unit 30. The balancer 60 is designed to mount between right sight post 32 and left sight post 36 and articulate vertically within sight window 31 by two threaded bolts 65 connected to the balancer "T" 64 through washers 66 and guide holes 35 and 39. The balancer pass-through 62 of balancer 60 is hollow to allow the top resistance band 90 to freely pass through it as the user draws back on the one or both resistance bands 90 and 92.

The user may optionally attach a sight 100 to the right or left sight posts 32 and 36. The most common sights 100 have a ring housing several pins, but numerous variations of sights 100 are commercially available. Many sights 100 have standardized spacing of holes to couple with a bow (or handle structure 10). The spacing of sight guide holes 33 and 34 as well as sight guide holes 37 and 38 may be spaced to easily couple with the standardized spacing of sight 100 or an adapter. A sight 100 coupled to handle structure 10 may be, for example, the user's own bow sight utilized for hunting, a practice bow sight, or a bow sight specifically designed for the archery training system 1, such as a mechanical trainer sight, an electrical trainer sight, and/or a video game trainer sight. All of these sights, and other sights sold for use with a bow, are contemplated when we use the terms "sight" or "bow sight" herein. FIG. 5 illustrates an implementation employing a sight 100 attached to the housing unit 30 of the handle structure 10.

Referring still to FIGS. 1-5, the handle area 20 allows the user to grip the handle structure 10 at handle 26 with the non-shooting (i.e., the hand not used to draw back a string and arrow, which is often the user's non-dominant hand). Handle 26 may be shaped to be held by either the left or right hand of the user to freely accommodate the user's preferred shooting hand. Alternative implementations utilize a handle 26 shaped specifically for either one hand or the other. Handle area 20 contains a hollow section 23 through handle 26, which is open at the top and bottom, respectively, via top port 22 and bottom port 24. Hollow section 23 and ports 22 and 24 are sufficiently large to allow top resistance band 90 to freely pass through, or of a larger diameter if additional larger elements are attached to top resistance band 90 (e.g., interconnectors 200 or 220 as shown in FIGS. 18A-31).

Stabilizer connector 45 houses threaded stabilizer insert 52 positioned approximately orthogonal to the long axis of handle structure 10, which allows the user to optionally attach a variety of different bow stabilizers (e.g., stabilizer 280 as shown in FIGS. 38-47) to handle structure 10 to more accurately mimic the feel of shooting a real bow with an attached stabilizer. Stabilizers are commercially available in many different sizes, shapes, and weights, and many utilize a standardized threaded connector, which may couple with the threaded stabilizer insert 52. Stabilizers may improve bow performance in one or more of the following ways: reducing torque, moving the center of gravity, improving the moment of inertia, helping to keep a bow steady when shooting, dampening vibrations, and reducing hand shock.

In some implementations, a stabilizer according stabilizer 280 of FIG. 38 may be implemented. In further implementations, the user may connect additional accessories to stabilizer connector 45 other than a stabilizer (e.g., strength training weights, wrist slings, and the like).

The tensioning area 40 of handle structure 10 includes top tensioner 70 and bottom tensioner 72. Top spool 73 of top tensioner 70 couples with the proximate section 95 of top resistance band 90. Top adjustment knob 75 axially bisects and physically engages via hex shape key and lock style mechanism with top spool 73, passes through washers 77 and hollow top tensioner guide hole 49, and terminates in a twisting nut 79. The user can select the amount of tension for the top resistance band 90 by rotating the top adjustment knob 75 counterclockwise and then inserting locking pin 80. Locking pin 80 is configured to lock the position of top tensioner 70 by passing through one or more sets of holes in top spool 73 and into top locking pin housing 50.

In a relatively similar fashion, bottom spool 74 of bottom tensioner 72 couples with the proximate section 97 of bottom resistance band 92. Bottom spool 74 is housed in the space provided by the bottom tensioner slot 41. Bottom adjustment knob 76 axially bisects and physically engages via hex shape key and lock style mechanism with bottom spool 74; passes through hollow bottom tensioner guide holes 43 and 47, washers 77, and bushing 78; and terminates in a twisting nut 79. The user may adjust the amount of tension for the bottom resistance band 92 by rotating the bottom adjustment knob 76 counterclockwise and then inserting locking pin 80. Locking pin 80 is configured to lock the position of bottom tensioner 72 by passing through bottom locking pin housing 44, one or more sets of holes in bottom spool 74, and bottom locking pin housing 48.

Top resistance band 90 and bottom resistance band 92 may be tubular elastic bands made of rubber elastomer (e.g., such as surgical tubing or athletic resistance bands). The top interconnector 91 at the distal section 94 of top resistance band 90 and the bottom interconnector 93 at the distal section 96 of bottom resistance band 92 may be left unattached and freely move when the archery trainer device 1 is not being used. Interconnectors 91 and 93 may have looped ends designed for release aids. During dry firing, distal sections 94 and 96 of resistance bands 90 and 92 will be located near the user's torso and shooting hand. Handle structure 10 and balancer 60 are configured such that, when fully drawn during dry firing, top resistance band 90 (or at least most of the full length of top resistance band 90 are) positioned substantially orthogonal to the long axis of handle structure 10 (e.g., positioned at 90°±20°; 90°±15°; or 90°±10°). Top resistance band 90 freely moves through balancer pass-through 62 of balancer 60, which articulates vertically by pivoting around the axis of bolts 65 and guide holes 35 and 39. Upon exiting the front of balancer 60, the top resistance band 90 bends downwards and passes through hollow section 23 to couple to top tensioner 70. Thus, the top resistance band 90 roughly aligns parallel with the long axis of the handle structure 10 as it passes through hollow section 23 (i.e., within about ±30° of being parallel).

The resistance bands 90 and 92 may be of sufficient strength to be able to support the resistive forces created by expansion thereof. This force may be approximately 1-70 pounds. However, in alternate implementations, different resistance bands 90 and 92 may be used which result in variances of resistive force, also referred to herein as tension. Additionally, in other implementations, the resistance bands 90 and 92 may be replaced by other types of pressure, compression, and/or tension devices or items that provide similar levels of resistive force/tension. For example, one or both of resistance bands 90 and 92 may be rigid or flexible bands attached to a flywheel, cam, or other resistance device.

It may be noted that the top resistance band 90 may be approximately 15-31 inches in length and the bottom resistance band 92 may be approximately 13-29 inches in length to enable adequate adjustment of tension and draw length. In one implementation, the top resistance band 90 is about 31 inches in length and the bottom resistance band 92 is about 29 inches in length. Further, the length of interconnectors 91 and 93 of the resistance bands 90 and 92 may be approximately 0.2 to 4 inches (e.g., 1 inch). Other sizes of tensioners and lengths of bands can work.

The top and bottom spools 73 and 74 are sufficiently wide for resistance bands 90 and 92 to spool around an inner diameter, and have an inner diameter of approximately 0.3-2.5 inches and an outer diameter (for each side of the spool) of approximately 0.7-4.0 inches. In one implementation, top spool 73 has an inner diameter of about 0.5 inches and an outer diameter of about 1.5 inches, while bottom spool 74 has an inner diameter of about 1.5 inches and an outer diameter of about 2.0 inches. The proximate ends of resistance bands 90 and 92 may fixedly or loosely attach to spools 73 and 74 in a variety of ways, such as: screws and plates, screws 82, a slot 84 in the inner diameter of the spool 73 or 74, tying the resistance band 90 or 92 around the inner diameter, adhesives, a notch or bight, and so forth.

Handle structure 10 may be approximately 14-24 inches tall, or in some implementations, approximately 16-19 inches tall (e.g., 17.5 inches). Handle structure 10 may be approximately 1-3 inches wide and 1-3.5 inches deep at the top tensioner guide hole 49 (e.g., 1.3 inches wide by 1.5 inches deep), and approximately 2-4 inches wide at the sight window 31 (e.g., 2.5 inches) (where "wide" is the x-axis and "deep" is the z-axis when viewing the face of the handle structure 10). The opening in handle structure 10 created by sight window 31 may be approximately 1.5-3.0 inches wide by 4-8 inches tall (e.g., 2.1 inches wide by 5.75 inches tall). Right and left sight posts 32 and 36 may each be approximately 0.15-0.9 inches wide (e.g., 0.4 inches). Balancer 60 may have a diameter of about 0.3-0.9 inches, be approximately 1.2-2.8 inches wide (at the balancer "T" 64), and be approximately 2-6 inches deep (i.e., the length of the balancer pass-through 62). In one implementation, the balancer 60 has a diameter of 0.5 inches, a width of 2 inches, and a depth of 4.25 inches. The free space of hollow section 23 may have a minimum diameter of at least 0.25-1.3 inches (e.g., 0.5 inches), and may have a circular, elliptical, oblong, rectangular, or other shaped cross-section. Bottom tensioner slot 41 may be approximately 0.5-1.8 inches wide by 2-4 inches tall (e.g., 0.7 inches wide by 3 inches tall) and sized sufficient to house the bottom spool 74. Right and left tensioner posts 42 and 46 may each be approximately 0.15-0.9 inches wide (e.g., 0.3 inches).

The dimensions of the handle structure 10 and other disclosed elements are related to the materials used to construct the elements in addition to attributes of the intended user. As such, the disclosed dimensions are anticipated to change by some degree depending on material choice and user attributes (e.g., differing sizes based on the user's age, gender, ability, or preference). For example, a child's version may be smaller than an adult version and possibly even smaller than the ranges of dimensions disclosed for handle structure 10 above.

It should be known that the terms nut, bolt, insert, and knob are used to cover all types of external or internal threaded items that can be substituted and used herein. It should also be known that the term looped is used to cover all types of ropes, strings, cables, wire, rings, or other items such that can be substituted and used herein, which may range from flexible to rigid. In addition, it should be known that the term resistance band is used to cover all types of elastic and items creating tension that can be substituted and used herein.

Handle structure 10 may be manufactured from plastic, wood, laminates, metal, fiber reinforced plastics (e.g., carbon or glass fibers in acrylonitrile butadiene styrene ("ABS") plastic), or another sturdy material. The balancer 60 may likewise be manufactured from a variety of materials, such as plastics (e.g., ABS), metals, and so forth. The top resistance band 90 and bottom resistance band 92 may be manufactured from rubber, latex, or another elastic material. For the purposes of this disclosure, we focus on resistance bands 90 and 92 constructed using elastomer tubing or cables made from rubber or latex, but other elastic materials are available (e.g., sheathed elastic cords, elastic straps, and so on). Both resistance bands 90 and 92 may be constructed using the same materials, or may also use different materials. The top and bottom interconnectors 91 and 93 may be flexible or rigid and may be manufactured from plastic, metal, nylon, or another material with good properties for interconnectors, cords, loops, or rings. The disclosed threaded and non-threaded: bolts, nuts, washers, pins, inserts, bushings, and knobs (e.g., threaded bolts 65, washers 66, and sight mount inserts 67) may be manufactured from one or more machined metal (e.g., stainless steel, aluminum, brass, etc.), plastic, or another sturdy material. For example, the adjustment knobs 75 and 76 may have a stainless steel threaded shaft with an ABS plastic handle portion. The top and bottom spools 73 and 74 may be manufactured from metal (e.g., aluminum), plastic, or another sturdy material.

FIG. 5 illustrates a user dry firing an archery training system 1. In operation, a user of the archery training system 1 will grasp the handle structure 10 with the non-shooting hand, meaning the left hand if the user shoots right-handed or the right hand if the user shoots left-handed. With the other hand (i.e., the shooting hand) the user will engage a release aid 85 to one or both interconnectors 91 and 93 of resistance bands 90 and 92. If the release aid 85 is a version using a one-sided hook, then the user will feed the looped end of top interconnector 91 through the looped end of bottom interconnector 93 and attach the hooked-version release aid 85 to looped end of top interconnector 91. A clasp-style release aid 85 can be attached in the same manner or clasped around looped ends of both interconnectors 91 and 93 at the same time. Then the user fully extends the arm grasping the handle structure 10 so that the balancer 60 is positioned roughly perpendicularly to the user's body for example. The user's hand with the release aid 85 (normally used to draw a bowstring) draws rearward from the handle structure 10 expanding resistance bands 90 and 92, thereby mimicking the motion and feel of drawing a bowstring. When the top resistance band 90 exposed from the balancer 60 expands rearward relative to the handle structure 10, thereby creating weighted tension approximately equal to the draw weight of a fully drawn bowstring (e.g., approximately 1-70 pounds, 1-40 pounds, 3-30 pounds, or 3-22 pounds). When the bottom resistance band 92 expands rearward relative to the handle structure 10, it creates weighted tension counterbalancing the force or tension generated by an expanded top resistance band 90 (e.g., approximately 1-70 pounds, 1-40 pounds, 3-30 pounds, or 3-19 pounds). Bottom resistance band 92 may be adjusted to better counterbalance the handle structure 10 and/or the extended top resistance band 90 according to the user's preference and shooting style. When the user's release aid 85 is triggered to release interconnector 91 of top resistance band 90, each resistance band will retract to original position in a safe and controlled manner. Application of the archery training system 1 as described will be repeated as desired to achieve muscle strengthening, psychological confidence, and shooting form enhancement specific to the manipulation of a release aid 85.

Referring still to FIGS. 1-5, the user can adjust the tension of top resistance band 90 by removing locking pin 80 from the top locking pin housing 50, loosening top adjustment knob 75, rotating top spool 73 counterclockwise to increase tension or clockwise to decrease tension, tightening top adjustment knob 75, and then inserting locking pin 80 through top spool 73 and into top locking pin housing 50. In this manner, the user may rotate top spool 73 by turning top adjustment knob 75 a number of top turns 55 (e.g., 0.25 to 4.00 turns, 0.25 to 1.50 turns, etc.). The user can adjust the tension of bottom resistance band 92 by removing locking pin 80 from the bottom locking pin housings 44 and 48, loosening bottom adjustment knob 76, rotating bottom spool 74 counterclockwise to increase tension or clockwise to decrease tension, tightening bottom adjustment knob 76, and then inserting locking pin 80 through bottom spool 74 and bottom locking pin housings 44 and 48. In this manner, the user may rotate bottom spool 74 by turning bottom adjustment knob 76 a number of bottom turns 56 (e.g., 0.25 to 4.00 turns, 0.25 to 1.50 turns, etc.). The number of top turns 55 and number of bottom turns 56 are measured with respect to an original position of spools 73 and 74. For example, spools 73 and 74 may be configured to turn in increments of ⅒, ⅛, ¼, or ½ of a turn (i.e., a full rotation of spools 73 or 74).

Thus, in operation, when the user holds handle structure 10 at handle 26 and then draws or pulls rearward with release aid 85 coupled to interconnectors 91 and 93, resistance bands 90 and 92 both expand creating draw tension (by top resistance band 90) and counter tension (by bottom resistance band 92) to balance the handle structure 10. When the release aid 85 is operated or triggered per manufacturer design, the resistance bands 90 and 92 retract to original size away from the user safely. Thus, the user may safely "dry fire" archery training system 1.

Tables 1 and 2 below list examples according to some implementations of the resulting tension a user feels during dry firing of archery training system 1 depending on: the top draw length 98, the bottom draw length 99, the number of top turns 55, and the number of bottom turns 56. Table 1 lists the resulting tension the user feels from top resistance band 90 depending on the user's set top draw length 98 and the number of top turns 55 the user turned top spool 73 of top tensioner 70. For example, with a top draw length 98 set to 26 inches, the user may change the tension from 9 pounds at the original position (i.e., top number of turns 55=0.00 turns) to 12 pounds of tension by rotating top spool 73 counterclockwise by three quarters of a full rotation (i.e., top number of turns 55=0.75 turns) (see Table 1).

TABLE 1

| Top Draw Length 98 (in inches) | Top Spool 73 Rotated by _.__ Top Number of Turns 55 | | | | | | |
|---|---|---|---|---|---|---|---|
| | 0.00 | 0.25 | 0.50 | 0.75 | 1.00 | 1.25 | 1.50 |
| | Resulting Tension of Top Resistance Band 90 (in lbs.) | | | | | | |
| 20" | 3 | 4 | 5 | 6 | 7 | 8 | 9 |
| 21" | 4 | 5 | 6 | 7 | 8 | 9 | 10 |
| 22" | 5 | 6 | 7 | 8 | 9 | 10 | 11 |
| 23" | 6 | 7 | 8 | 9 | 10 | 11 | 12 |
| 24" | 7 | 8 | 9 | 10 | 11 | 12 | 13 |
| 25" | 8 | 9 | 10 | 11 | 12 | 13 | 14 |
| 26" | 9 | 10 | 11 | 12 | 13 | 14 | 15 |
| 27" | 10 | 11 | 12 | 13 | 14 | 15 | 16 |
| 28" | 11 | 12 | 13 | 14 | 15 | 16 | 17 |
| 29" | 12 | 13 | 14 | 15 | 16 | 17 | 18 |
| 30" | 13 | 14 | 15 | 16 | 17 | 18 | 19 |
| 31" | 14 | 15 | 16 | 17 | 18 | 19 | 20 |
| 32" | 15 | 16 | 17 | 18 | 19 | 20 | 21 |
| 33" | 16 | 17 | 18 | 19 | 20 | 21 | 22 |

Table 2 lists the resulting tension the user feels from bottom resistance band 92 depending on the user's set bottom draw length 99 and the number of bottom turns 56 the user turned bottom spool 74 of bottom tensioner 72. For example, with a bottom draw length 99 set to 18 inches, the user may change the tension from 18 pounds at the original position (i.e., bottom number of turns 56=0.00 turns) to 5 pounds of tension by rotating bottom spool 74 counterclockwise by one and one quarter rotations (i.e., bottom number of turns 56=1.25 turns) (see Table 2). In other words, the original or start position of the bands the when the spools are turned counter clockwise until the top band is within 1 inch of the balancer opening. Then the initial adjustment for draw lengths 15"-19" is clockwise thereby resulting in the measurements of Table 2.

TABLE 2

| Bottom Draw Length 99 (in inches) | Bottom Spool 74 Rotated by _.__ Bottom Number of Turns 56 | | | | | | |
|---|---|---|---|---|---|---|---|
| | 0.00 | 0.25 | 0.50 | 0.75 | 1.00 | 1.25 | 1.50 |
| | Resulting Tension of Bottom Resistance Band 92 (in lbs.) | | | | | | |
| 15" | 15 | 11 | 9 | 6 | 5 | 3 | nr |
| 16" | 16 | 12 | 10 | 7 | 6 | 4 | nr |
| 17" | 17 | 13 | 11 | 8 | 7 | 5 | 4 |
| 18" | 18 | 14 | 12 | 9 | 8 | 6 | 5 |
| 19" | 19 | 15 | 13 | 10 | 9 | 7 | 6 |

Tables 1 and 2 provide examples of possible tension settings for resistance bands 90 and 92, but these values for tension may change if resistance bands 90 and 92 are constructed of different materials, have a thicker or thinner gage, tensioning elements are added or removed (e.g., adding elastic bands within a hollow tube), and so forth.

The total tension felt by the user is the sum of the tension from the top resistance band 90 and the tension from the bottom resistance band 92. Tension can be measured by putting end loop 91 through end loop 93, connecting a scale to end loop 91, drawing rearward to each respective draw length in relationship to a tape measure for example, and reading the scale measurement respectively.

Many additional archery training system implementations are possible. For the exemplary purposes of this disclosure, some implementations include other enhancements, accessories, or add-ons aimed at furthering the user's experience and application of an archery training system, such as, but not limited to: Weighted threaded male bolts or alternate components that provide the user with vertical resistance similar to that experienced during the operation of a compound bow; Electronic bow sights including pins and electronic ports to connect enhancements, accessories, or add-ons; Electronic archery target or receiving unit; Electronic mechanical release aid or electronic push switch sleeve fitting various mechanical release aids on the market today; Electronic controller built into the handle structure; Electronic handgrip or electronic push switch handgrip adaptor; Archery training, entertainment, and competition video game controlled by the electronic bow sights, electronic handgrip, handle structure, and/or the electronic mechanical release aid; and/or Wrist sling.

Figure 6:
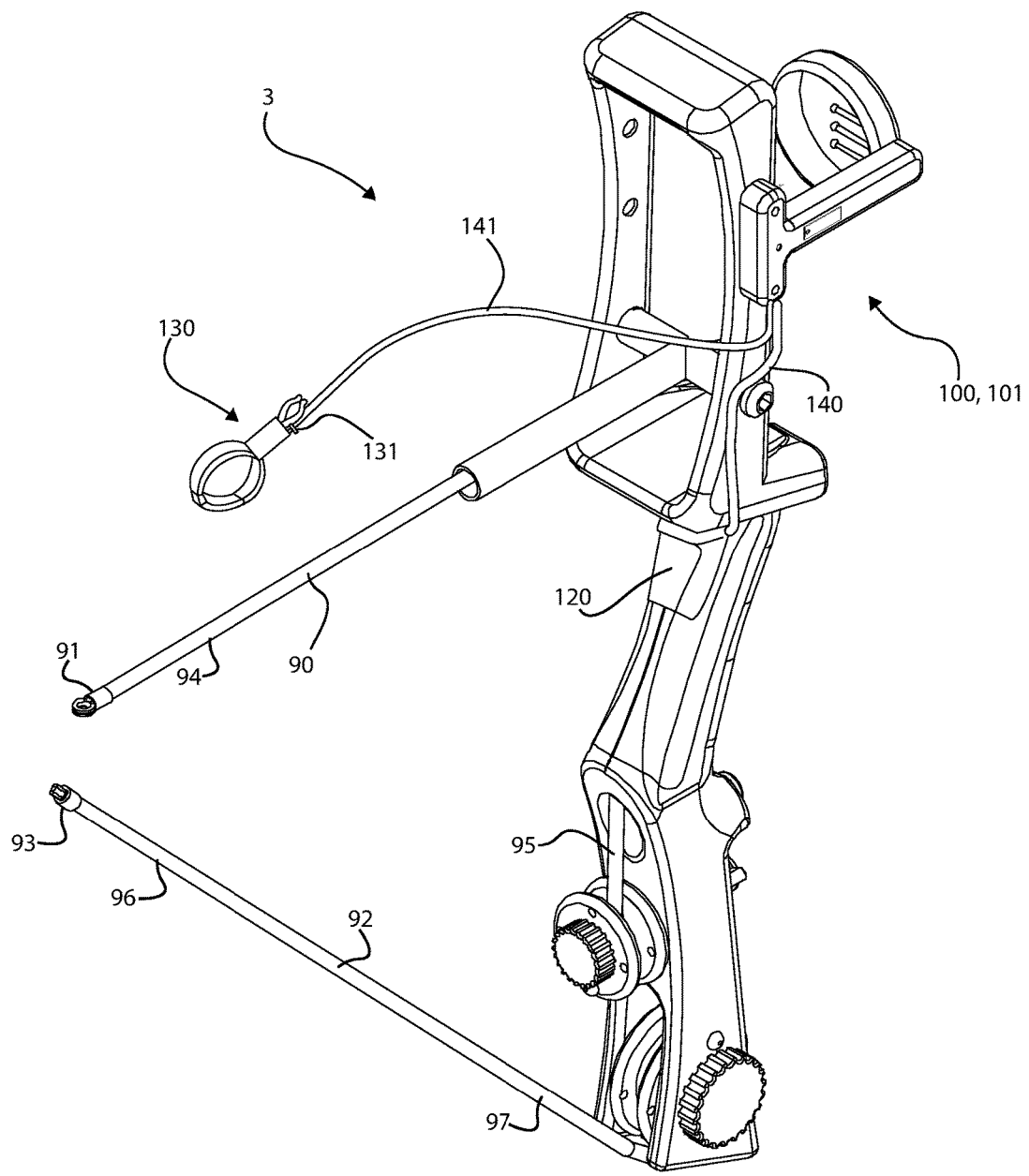
FIG. 6 depicts implementations of an archery training system including electrical components.

FIG. 6 depicts implementations including electrical components. Archery training system 1 may be implemented as an electronic training system 3 by including components such as an electronic sight 101. Sight 100 is coupled to either right sight post 32 (as shown) or left sight post 36. In certain implementations, sight 100 is an electronic sight 101 having electronically enabled sight elements and/or the ability to interact with additional electronic components.

Grip sensor 120 is attached or incorporated into handle 26 of handle structure 10. Grip sensor 120 is electrically coupled to grip switch 121 (see FIG. 8) and may comprise, for example, a pressure plate that actuates or compresses to activate the electrical components of grip switch 121 when the user grips handle 26. Grip sensor 120 electronically communicates with electronic sight 101 using the handle to sight bus 140.

Figure 8:
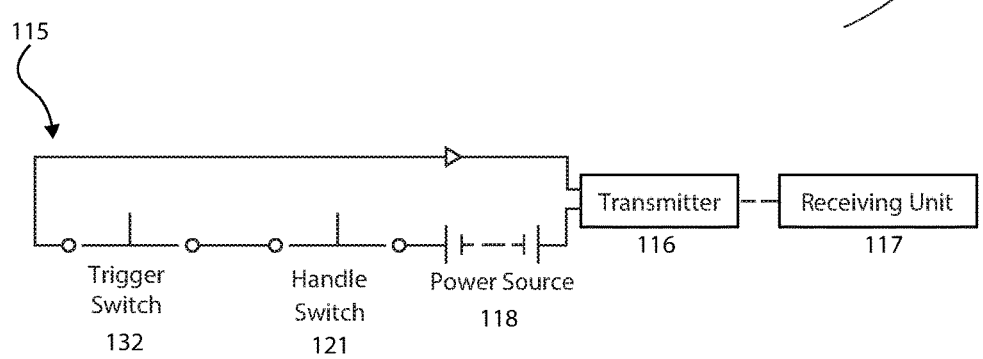
FIG. 8 shows a circuit diagram of various implementations of an archery training system including electrical components according to the implementations of FIG. 6.
Figure 9:
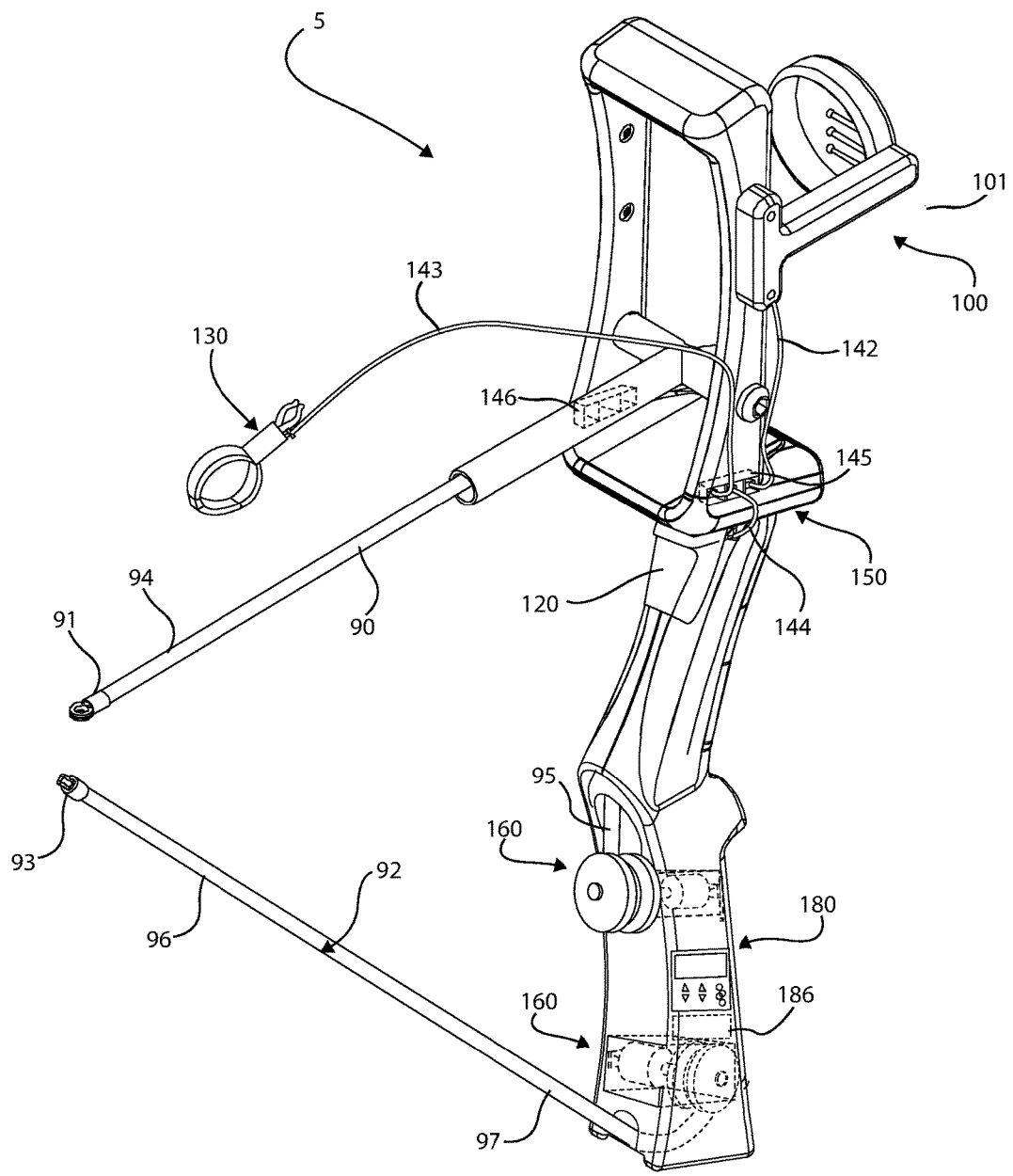
FIG. 9 depicts additional implementations of an archery training system including electrical components such as a motorized tensioner.

Electronic release aid 130 includes an electronic trigger 131 that is electrically coupled to a trigger switch 132 (see FIG. 8). Electronic trigger 131 may electronically communicate with electronic sight 101 using the trigger to sight bus 141. Electronic sight 101 and additional electronic components may, for example, include: electrically illuminated sight pins; positioning devices that interact with a video game, smart phone application, and the like.

Figure 7:
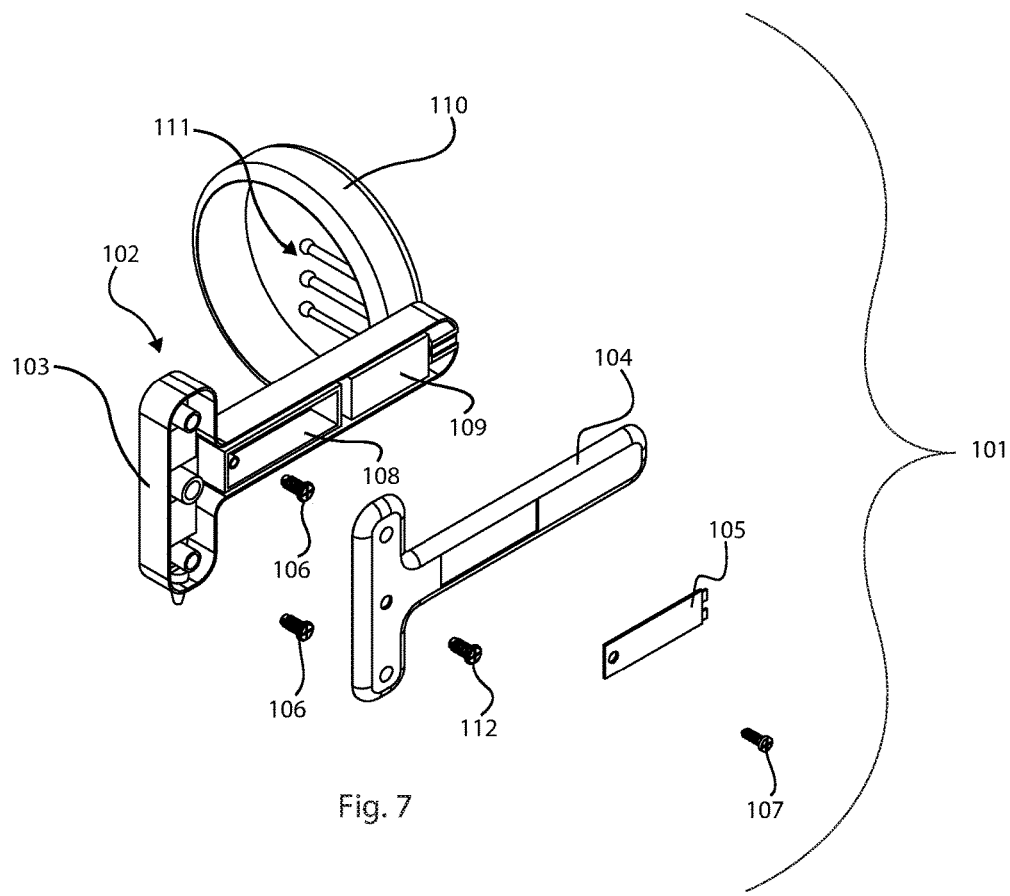
FIG. 7 shows various implementations of an electronic sight according to the implementations of FIG. 6.

FIG. 7 shows various implementations of electronic sight 101. Electronic sight 101 includes a sight arm 102 attached to a sight ring 110 with at least one (three shown) sight pin 111 attached to and protruding inwards from sight ring 110. Sight arm may include electronic circuitry 109 receiving power from a battery or other power source (not shown) located in battery slot 108, all of which is housed within arm housing 103 and covered by arm cover 104. Electronic sight 101 attaches to right sight post 32 using threaded bolts 106 that couple the sight arm 102 to bow sight guide holes 33 and 34 (using sight mount inserts 67). Bolts 106 can similarly attach electronic sight 101 to left sight post 36. Bolts 106 can be configured to be hidden under arm cover 104 or alternatively be accessible to insert or be removed from bow sight guide holes 33 and 34 while arm cover 104 is fixedly mated with arm housing 103. Arm cover 104 mates with arm housing 103 and is secured by bolt 112. Battery slot 108 is covered by battery cover 105, which is secured by bolt 107. It will be apparent to one of ordinary skill in the art that in some implementations a bolt may be interchangeable with a screw or other removable fasteners.

Electronic circuitry 109 may include circuits, logic, firmware, and/or software to control electrical operation of one or more of the electrical and/or electromechanical elements of electronic training system 3. For example, electronic circuitry 109 may include circuitry 115 and/or transmitter 116 of FIG. 8. In alternative implementations, electronic circuitry 109 performs a portion of these controlling functions while an additional controller circuit is incorporated in another area of electronic training system 3 (e.g., coupled to sight area 30, handle area 20, or tensioning area 40). In further alternative implementations, electronic circuitry 109 is omitted from electronic sight 101 altogether.

FIG. 8 shows a circuit diagram of various implementations of electronic training system 3. Circuitry 115 powered by power source 118 may be implemented and assist a user in archery training. When the user dry fires electronic training system 3 by activating the electronic trigger 131 of electronic release aid 130, trigger switch 132 is closed. In addition, the grip switch 121 of grip sensor 120 will have already been closed because the user is firmly holding the handle 26 in order to dry fire. With trigger switch 132 and grip switch 121 closed, an electronic pulse may initiate a sequence where transmitter 116 communicates wirelessly or in a wired fashion with receiving unit 117. Such communication can be for motion tracking methods and other features and methods.

FIGS. 9-12 depict additional implementations including electrical components where archery training system 1 may be implemented as a motorized tensioner training system 5. For example, either one or both of tensioners 70 and 72 may be replaced with a motorized tensioner 160. Control panel 180 may operate and adjust the one or more motorized tensioner device 160 using a display screen (possibly a touch screen) and/or various buttons, knobs, switches, arrows, and the like. For example, the user may adjust the amount of tension up or down for one or both of resistance bands 90 and 92 (each coupled with a motorized tensioner 160) through the interface of control panel 180. Battery supply 186 may also be added to provide power for control of motorized tensioners 160 or other electronically controlled elements. Electronic sight 101, electronic release aid 130, and grip sensor 120 may be electrically coupled to right hub 145 using sight bus 142, trigger bus 143, and handle bus 144. Left hub 146 may also electrically couple electronic elements in certain embodiments, for example, such as when electronic sight 101 is coupled to left sight post 36. While a wired system has been described, similar components can be configured to provide wireless communication and interaction.

Figure 10:
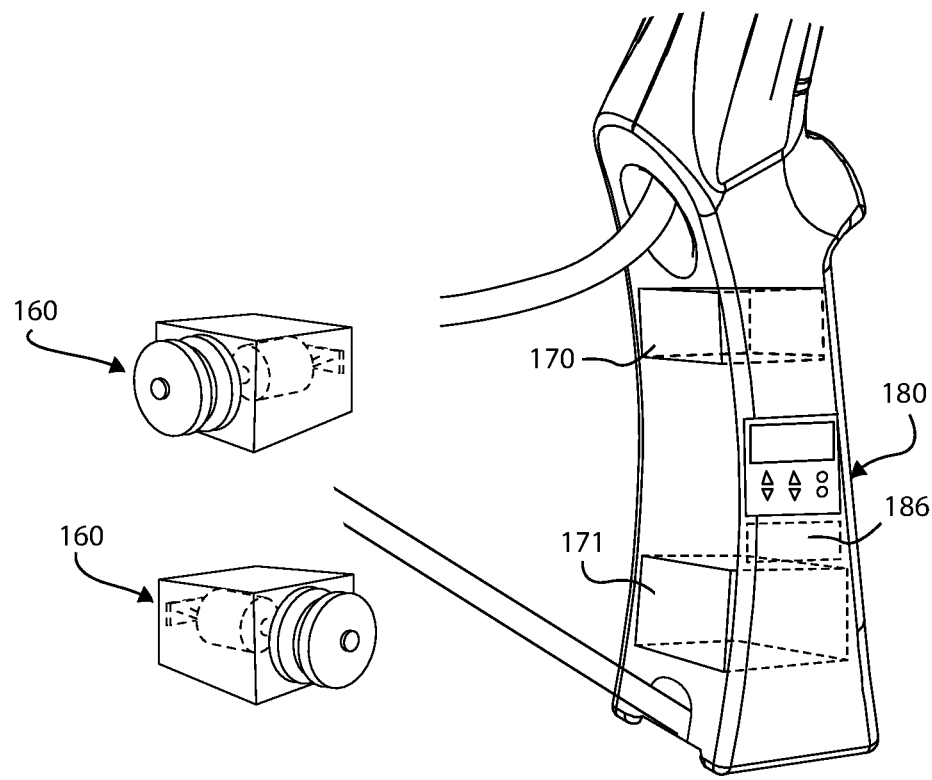
FIG. 10 is a detailed view of the tensioning area according to the implementations of FIG. 9.

FIG. 10 illustrates tensioning area 40 where motorized tensioners 160 can be housed in top recess 170 or bottom recess 171 formed within tensioning area 40 of handle structure 10. Top and bottom recesses 170 and 171 may be sufficiently large to house motorized tensioners 160 that are attached permanently or are removably affixed to handle structure 10 such that the motorized tensioners 160 do not separate from handle structure 10 when the motorized tensioner training system 5 is dry fired by a user.

Figure 11:
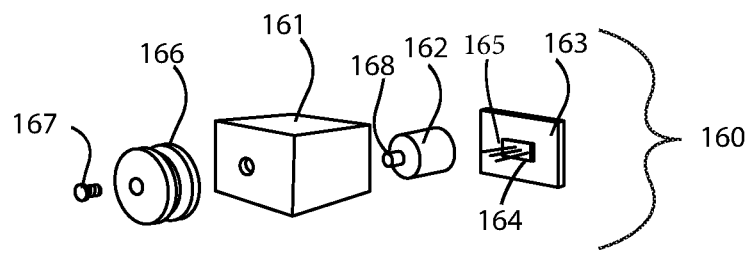
FIG. 11 is a first detailed view of a motorized tensioner according to the implementations of FIG. 9.
Figure 12:
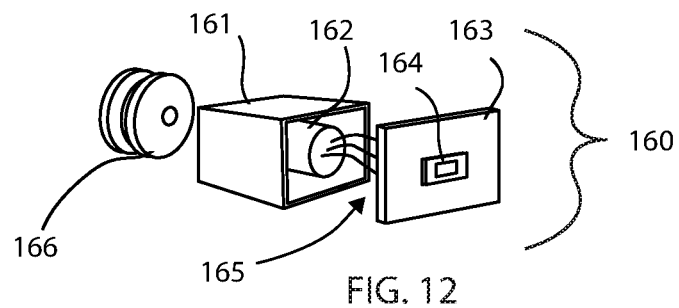
FIG. 12 is a second detailed view of a motorized tensioner according to the implementations of FIG. 9.

FIGS. 11 and 12 depict two exploded perspective views of the motorized tensioner 160. Motorized tensioner 160 may contain a motor 162 located in housing 161 with cover plate 163 having an electronic port 164. Wires 165 connect motor 162 to electronic port 164. Drive shaft 168 of motor 162 is configured to protrude from housing 161. Spool 166 couples with the drive shaft 168 of motor 162, for example, by using bolt 167 to fixedly secure spool 166 to drive shaft 168. Spool 166 is configured to couple with the proximate section 95 or 97 of, respectively, either top resistance band 90 or bottom resistance band 92. In some implementations two motorized tensioners 160 are employed (one coupled to top resistance band 90 and another coupled to bottom resistance band 92). In other implementations only one of resistance bands 90 and 92 are coupled with a motorized tensioner 160, while the other resistance band couples with another type of tensioner (e.g., tensioners 70 or 72, or rod tensioner 194 discussed below).

In some implementations, motorized tensioner training system 5 is operable to variably adjust the tension with a motorized tensioner 160. Motorized tensioner(s) 160 may be set to have a variable tension to mimic a compound bow having a set tension with a let-off. That is, the variable tension may be set at full strength for most of the user's draw length, but then reduced to a let-off strength tension for the last portion of the user's draw length. For example, motorized tensioner(s) 160 may set the tension at 40 pounds (an example of full strength) for most of the user's draw length, but then reduce the tension to 30 pounds (an example of a let-off tension) for the last portion of the user's draw length.

Figure 14:
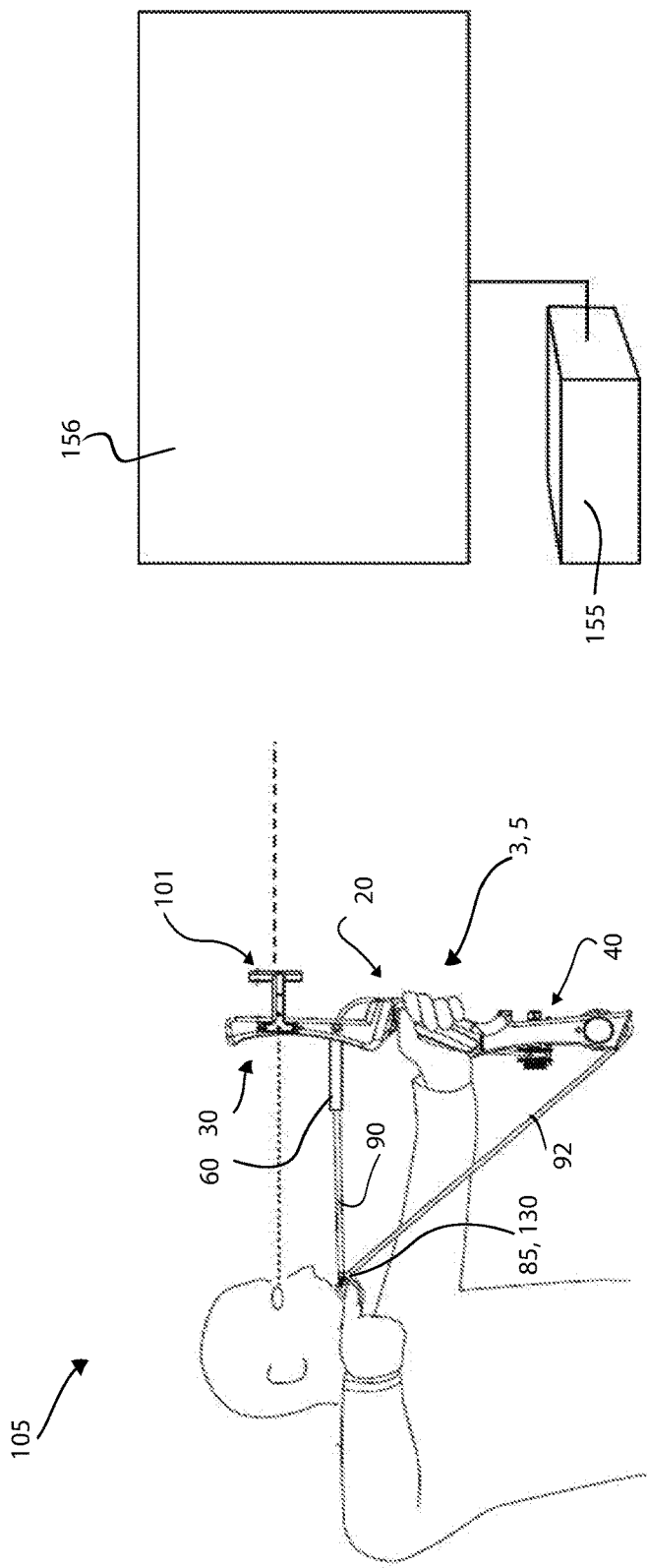
FIG. 14 illustrates an archery training system used with a video game.

FIG. 13 illustrates electronic training system 3 or motorized tensioner training system 5 used with an electronic simulator 152. FIG. 14 illustrates electronic training system 3 or motorized tensioner training system 5 used with video game console 155 and video display 156. For the exemplary purposes of this disclosure, in some implementations, an electronic training system 3 or motorized tensioner training system 5 may provide a platform for one or more electronic shooting modes 150, such as electronic target practice, video gaming, or other technological modes of delivery to provide instant user feedback in an entertaining yet educational way. Electronic target practice may consist of an electronic target board 153 that receives a signal from training system 3/5 when the training system 3/5 is actuated, thus enabling visual and audio feedback for quality of shot placement. Video gaming may include: a variety of 3D target courses from geographical locations worldwide; electronic bow sight 101 or other circuitry that will detect the rearward pull of resistance bands 90 and 92 and the placement of the sight pins 111 on the various 3D targets during course training, competition, and target practice; and electronic trigger 131 actuation of electronic release aid 130 causing flight of an arrow in the simulated gaming environment, thereby, simulating and providing a safe real world experience for users of all ages and gender.

Such electronic target shooting as described here affords universal application of the training system 3/5 for users of all skill level across the life continuum such as the provision of an alternative environment for competition, target shooting, and training; and public/private educators will now have an equally safe environment for instruction of novice archers. Examples of electronic components used in such implementations include one or more or all of the following. An electronic control (such as control panel 180) built into the handle structure 10 may regulate draw weight (i.e., tension), draw length 98/99, and store multiple user's settings in addition, but not limited, to navigating electronic gaming components via navigation buttons. The handle 26 may have pressure sensors (such as grip sensor 120), or any other mechanism for detecting the drawing of training system 3/5, to activate when resistance from user's hand in relationship to the preset draw weight and draw length 98/99 (in the handle structure) is detected at handle 26. Once the grip sensor 120 is activated then the electronic bow sight 101 may track sight movement in relationship to the electronic target (e.g., dartboard style target or 3D archery target gaming, etc.). With sight pins 111 placed on or near the target, the electronic trigger 131 of electronic release aid 130 is actuated by the user, which may then cause: 1) a laser signal to be sent to a dartboard-style target similar to the way laser tag works; or 2) an electronic signal is sent to a gaming console 155, thus triggering arrow flight simulation in the game in relationship to sight pin 111 placement and the target within the game. The simulated images produced by gaming console 155 may be displayed on display device 156, which may be a television or other display device. If the user chooses not to activate electronic trigger 131 of electronic release aid 130 and "let down" the training system 3/5 without firing an arrow, then a "kill switch" button (not shown) may be pressed by the user's index finger on the handle structure 10. Further examples, components, accessories, and explanations are provided below.

FIGS. 15-17 depict implementations of an archery training system 1 with a rod tensioner 190. FIG. 15 depicts an exploded side perspective view of implementations of a rod tensioner 190. FIG. 16 depicts a side perspective view of implementations of a rod tensioner 190. FIG. 17 depicts perspective views of implementations of an archery training system 1 with a rod tensioner 190. Rod tensioner 190 may be used instead of top tensioner 70, bottom tensioner 72, or motorized tensioner 160. Rod tensioner 190 may comprise a knob 194 attached to a coupling rod 195 coaxially aligned and coupled with threaded shaft 193. Knob 194 and coupling rod 195 may be manufactured together, for example, by injection molding plastic over a portion of threaded shaft 193, which may be metal or another sturdy material. Coupling rod is adapted to couple with resistance bands 90 or 92 (i.e., either proximate section 95 or 97) using coupling plate 192 that is secured with bolts 191 to apply pressure to resistance band 90 or 92. Rod tensioner 190 couples with handle structure 10 by inserting threaded shaft 193 through top tensioner guide hole 49 and screwing twisting nut 79 onto a protruding portion of threaded shaft 193. Referring specifically to FIG. 17, the user may increase tension of top resistance band 90 by rotating knob 194 counterclockwise (or decrease tension by rotating clockwise).

In some implementations, bottom tensioner 72 may slightly modified version of rod tensioner 190. For example, the amount of material of coupling rod 195 can be increased to coaxially extend further along threaded shaft 193 (e.g., extending to about length 196) and coupling plate 193 can move further along the axis to couple some distance away from knob 194 (e.g., the width of right tensioner post 42, 0.1-0.7 inches, and the like). Also, bottom tensioner guide hole can be sized to allow coupling rod 195 to pass through and bottom tensioner guide hole 47 can be threaded to fit threaded shaft 193. Thus, bottom resistance band 92 may be coupled with the extended coupling rod 195 at a coupling plate 192 centrally located within bottom tensioner slot 41.

FIGS. 18A-21 illustrate various implementations of a fixed interconnector 200. FIG. 21 illustrates a rear perspective view of various implementations of an archery training system 1 with fixed interconnectors 200. Fixed interconnector 200 may be used in place of one or both of top interconnector 91 and bottom interconnector 93. Fixed interconnector 200 may include an enclosure lid 202 designed to removably attach to enclosure body 201 using bolt 208, for example, in a clamshell fashion as shown. Enclosure lid 202 has hole 204 such that threaded bolt 208 can be screwed into and through hole 204 to couple with body boss 207, thereby securely attaching enclosure lid 202 to enclosure body 201. Fixed interconnector 200 is designed to fixedly attach to the distal section 94 or 96 of resistance bands 90 or 92, and can attach in a number of ways ("fixedly attach" does not mean "permanently attach" because distal section 94 or 96 can be removed by, for example, opening enclosure 201/202). Distal section 94 or 96 may attach by being inserted into entry hole 209 at tapered portion 203 and then tying part of distal section 94 or 96 in a knot with a diameter larger than entry hole 209. Some implementations may insert a stopper within a hollow interior of the elastomeric tube of distal section 94 or 96 where the stopper (not shown) has a diameter larger than entry hole 209. Or, distal section 94 or 96 may pass through a nut, ring, chock, or similar jamming element (again, larger than the diameter of the entry hole 209) and distal section 94 or 96 may be tied around this jamming element such that the knot is either inside or outside the fixed interconnector 200.

Loop 210 is provided to allow a user to engage a release aid 85 with the archery training system 1. Loop 210 couples with the enclosure body 201 and lid 202, and may couple in a variety of different ways. For example, both the enclosure body 201 and lid 202 may have a loop notch 205 so that tying loop 210 in a knot larger than the diameter of the loop notches 205 will prevent loop 210 from slipping out of fixed interconnector 200 during the tension experienced by dry firing. In some implementations loop 210 may pass through a nut, ring, chock, or similar jamming element (again, larger than the diameter of the loop notches 205). Loop 210 may also wrap around body boss 207 and/or lid boss 206, which are joined when enclosure lid 202 is bolted to enclosure body 201. Thus, loop 210 extends from the enclosure body 201 and lid 202 such that loop 210 may engage a release aid 85 without inadvertently detaching from the enclosure body 201 and lid 202.

Figure 22:
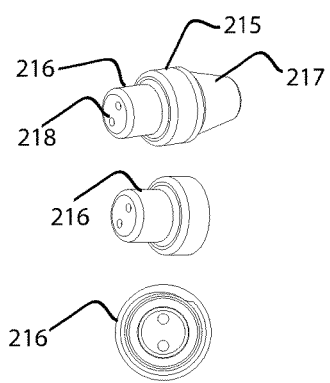
FIGS. 22-24 illustrate various implementations of a fixed interconnector.
Figure 23:
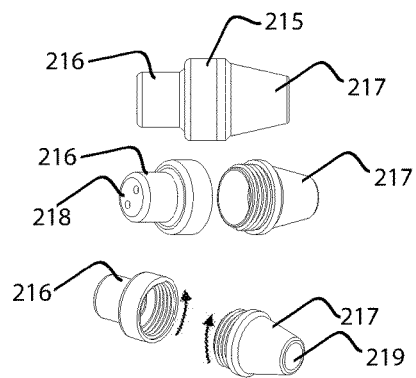
Figure 24:
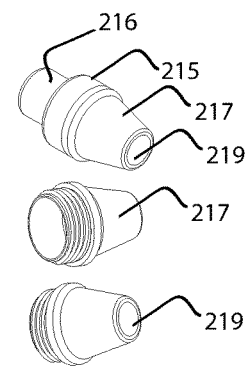
Figure 25:
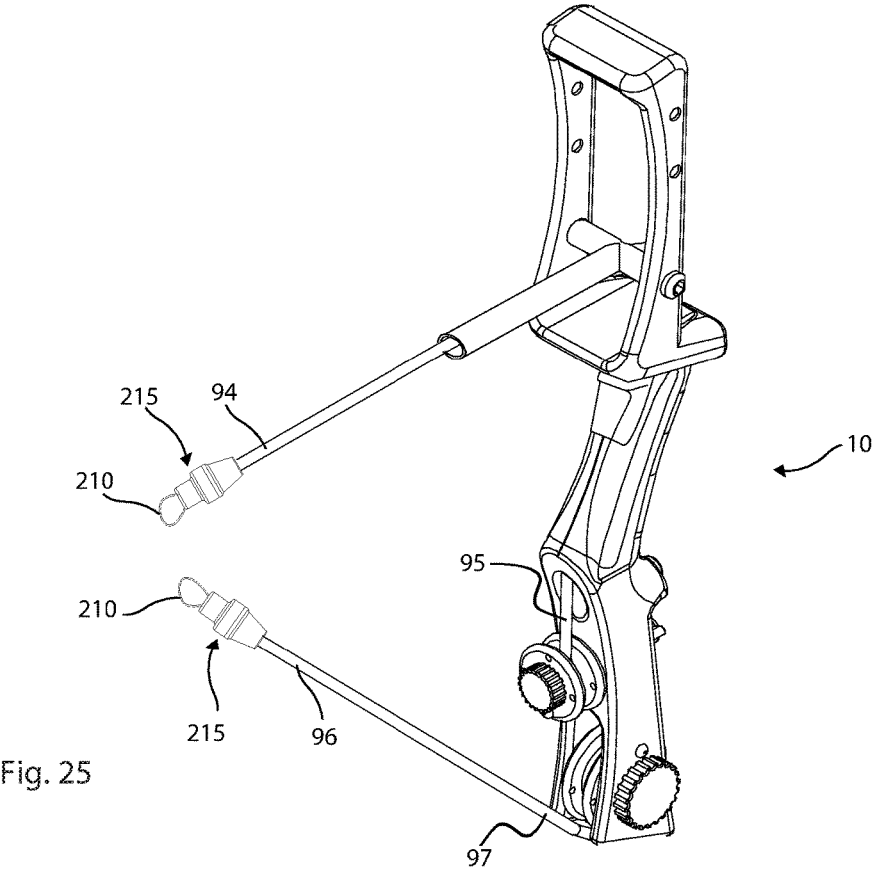
FIG. 25 illustrates a rear perspective view of various implementations of an archery training system with fixed interconnectors according to the implementations of FIGS. 22-24.

FIGS. 22-25 illustrate various implementations of a fixed interconnector 215. FIG. 25 illustrates a rear perspective view of various implementations of an archery training system 1 with fixed interconnectors 215. Fixed interconnector 215 may be used in place of one or both of top interconnector 91 and bottom interconnector 93. Fixed interconnector 215 may include a female portion 216 adapted to couple with a male portion 217 using any one of a variety of coupling or fastening mechanisms, such as male and female threaded couplers as shown in FIGS. 22-24. Fixed interconnector 215 is designed to fixedly attach to the distal section 94 or 96 of resistance bands 90 or 92, and can attach in a number of ways ("fixedly attach" does not mean "permanently attach" because distal section 94 or 96 can be removed by, for example, uncoupling female portion 216 and male portion 217). Distal section 94 or 96 may attach by being inserted into entry hole 219 and then tying part of distal section 94 or 96 in a knot with a diameter larger than entry hole 219. Some implementations may insert a stopper within a hollow interior of the elastomeric tube of distal section 94 or 96 where the stopper (not shown) has a diameter larger than entry hole 219. Or, distal section 94 or 96 may pass through a nut, ring, chock, or similar jamming element (again, larger than the diameter of the entry hole 219) and distal section 94 or 96 may be tied around this jamming element such that the knot is either inside or outside the fixed interconnector 215.

Loop 210 is provided to allow a user to engage a release aid 85 with the archery training system 1. Loop 210 couples with the fixed interconnector 215 at holes 218. Loop 210 may, for example, insert into one hole 218, out another hole 218, and then the ends of loop 210 are tied or coupled to securely couple to the female portion 216 of fixed interconnector 215. Alternatively, loop 210 may be tied into a knot or around a nut or stopper located inside the femail portion 216 so that the loop 210 will not slip out of hole(s) 219 because the knot/nut/stopper is larger than hole(s) 219. Thus, loop 210 extends from fixed interconnector 215 such that loop 210 may engage a release aid 85 without inadvertently detaching from the enclosure body 201 and lid 202.

FIGS. 26-30 illustrate various implementations of an adjustable interconnector 220. FIG. 30 illustrates a rear perspective view of various implementations of an archery training system 1 with adjustable interconnectors 220. Adjustable interconnector 220 may be used in place of one or both of top interconnector 91 and bottom interconnector 93. In addition, archery training system 1 may be implemented using a fixed interconnector 200 and an adjustable interconnector 220. Adjustable interconnector 220 may include an enclosure lid 222 designed to removably attach to enclosure body 221 using bolts 227, for example, in a clamshell fashion as shown. Enclosure lid 222 has holes 224 such that threaded bolts 227 can be screwed into and through holes 224 to couple lid and body portions of first boss 228 and second boss 229, thereby securely attaching enclosure lid 222 to enclosure body 221. Each of enclosure body 221 and enclosure lid 222 may have loop holes 223 for threading loop 230 through. Enclosure body 221 may have a sloped pincher 226 configured to operate with a scalloped pincher 225 of enclosure lid 222 such that distal section 94 or 96 is pinched between pinchers 225 and 226 to prevent distal section 94 or 96 from slipping out of the adjustable interconnector 220.

Adjustable interconnector 220 is designed to adjustably attach to the distal section 94 or 96 of resistance bands 90 or 92, and can attach in a number of ways. Distal section 94 or 96 may adjustably attach by being inserted into entry hole 231 and wrapping around first boss 228 (i.e., between first boss 228 and second boss 229) and exiting entry hole 231 (see, e.g., FIGS. 26 and 29). Thus, distal section 94 or 96 is prevented from slipping out of adjustable interconnector by the compression provided by the bight of distal section 94 or 96 around first boss 228. Alternatively, distal section 94 or 96 may wrap around second boss 229 instead of first boss 228. Some implementations may increase the bight on distal section 94 or 96 by wrapping around second boss 229 and then threading the distal end 232 of distal section 94 or 96 between second boss 229 and first boss 228 so that distal section 94 or 96 compresses against itself as it passes on one side of first boss 228.

Some implementations of adjustable interconnector 220 may use a clamp or other adjustably compressive element (not shown) to couple around a portion of distal section 94 or 96 nearest distal end 232 (and protruding outside of adjustable interconnector 220). This clamp or other adjustably compressive element tightly compresses distal section 94 or 96 or can slide up or down distal section 94 or 96 when not compressed. Further, this clamp or other adjustably compressive element prevents distal section 94 or 96 from slipping out of the adjustable interconnector 220 by being large enough to jam itself against entry hole 231 without slipping entirely out of adjustable interconnector 220. The clamp or other adjustably compressive element may, for example, be a: clamp, clasp, latch, cam, fastener, and the like.

Scalloped pincher 225 and sloped pincher 226 may also apply pressure to distal section 94 or 96 by clamping down on distal section 94 or 96 by the shape and degree of the scallops and slopes. Some implementations apply enough pressure to distal section 94 or 96 through scalloped pincher 225 and sloped pincher 226 so that they are the primary mechanism of preventing slippage. Other implementations may apply some pressure to distal section 94 or 96 through scalloped pincher 225 and sloped pincher 226, but also rely on other compressive or bighting mechanisms to prevent slippage. Further implementations may omit scalloped pincher 225 and sloped pincher 226 altogether (e.g., entry hole 231 would have non-pinching edges).

Loop 230 is provided to allow a user to engage a release aid 85 with the archery training system 1. Loop 230 couples with the enclosure body 221 and lid 222, and may couple in a variety of different ways. For example, both the enclosure body 221 and lid 222 may have holes 223 so that loop 230 can pass through holes 223 and create a loop 230. Alternative implementations may couple loop 230 using loop notches 205 or holes 219 (see fixed interconnector 200 and fixed interconnector 215) instead of holes 223. It follows that fixed interconnector 200 or fixed interconnector 215 may also use holes 223 to couple with loop 210 instead of loop notches 205 or holes 219. A person of ordinary skill in the art can (a) couple loop 230 to adjustable interconnector 220, (b) couple loop 210 to fixed interconnector 200, or (c) couple loop 210 to fixed interconnector 215 using a variety of other coupling or fastening mechanisms not expressly discussed here (e.g., couplers, fasteners, knots, bights, chocks, plugs, stoppers, loops, clasps, etc.), and these other couplers and fasteners are implicitly included in this disclosure.

Moreover, it follows that a person of ordinary skill in the art may readily envision other mechanisms to fixedly couple distal section 94 or 96 to fixed interconnector 200 or to adjustably couple distal section 94 or 96 to adjustable interconnector 220 by using numerous additional coupling or fastening mechanisms not expressly discussed here. For example, couplers, fasteners, knots, bights, chocks, plugs, stoppers, loops, clasps, and so forth may be used. These additional couplers and fasteners are implicitly included in this disclosure.

Figure 31:
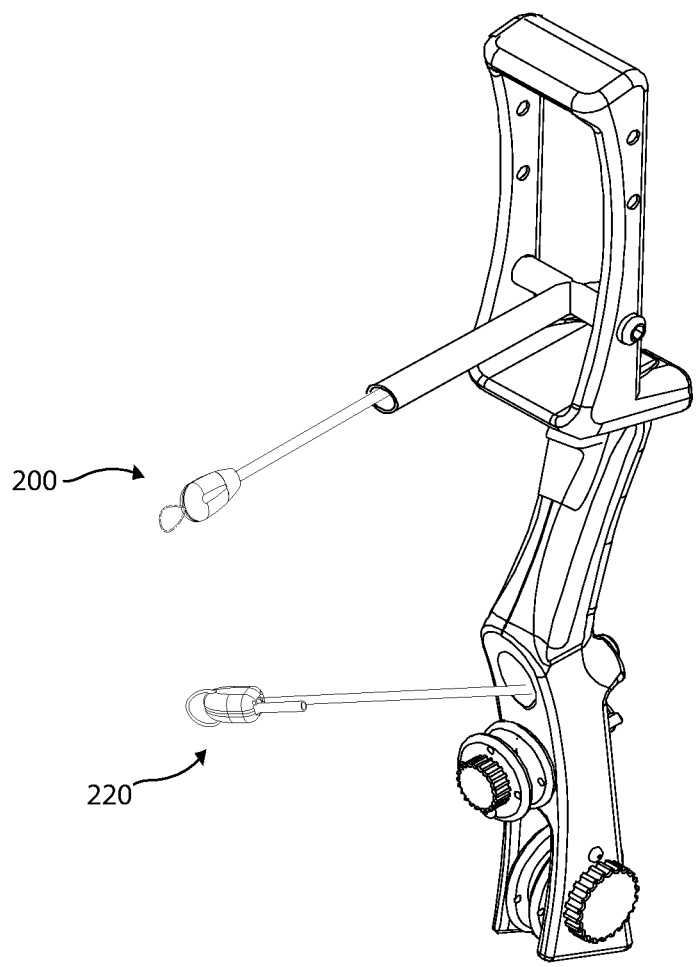
FIG. 31 is a perspective view of an archery strength trainer.

FIG. 31 is a perspective view of various implementations of an archery strength trainer 7. Strength trainer 7 may be implemented using, for example, any one of archery training system 1, electronic training system 3, or motorized tensioner training system 5. In strength trainer 7, top and bottom resistance bands 90 and 92 are omitted, a strength resistance band 242 is added, and the tensioners (70, 72, 160, or 190) are not coupled to any resistance bands (90, 92, or 242). Strength resistance band 242 is manufactured to provide sufficient resistance to allow the user to increase the strength of muscles used in archery by dry firing strength trainer 7. Strength trainer 7 may employ a set of various strength resistance bands 242 having different resistance values that may be color coded for ease of use (e.g., green band=10 lbs., blue band=20 lbs., yellow band=30 lbs., black band=40 lbs., red band=50 lbs., and so forth). Strength resistance band 242 may include a top distal section 244, a bottom distal section 246, and a bottom distal end 248. Strength resistance band 242 couples with handle structure 10 by passing through balancer pass-through 62, top port 22, hollow section 23, and bottom port 24 in a manner similar to top resistance band 90 of archery training system 1 (see FIGS. 1-3). However, strength resistance band 242 differs from top resistance band 90, for example, because bottom distal section 246 does not couple with top tensioner 70. Instead, bottom distal section 246 of strength resistance band 242 bends outwards upon exiting bottom port 24 to extend away from handle structure 10. Bottom distal section 246 may couple with various interconnectors, such as interconnector 91/93, fixed interconnector 200, or adjustable interconnector 220 (as shown). Similarly, top distal section 244 may couple with an interconnector such as interconnector 91/93, fixed interconnector 200 (as shown), or adjustable interconnector 220. Top and bottom distal sections 244 and 246 may couple with interconnectors 91, 93, 200, or 220 in manners similar to the way these interconnectors couple with distal sections 94 and 96 as described herein.

The user may practice strength-training exercises with strength trainer 7, for example, by coupling a release aid 85 (not shown) to loops 210/230 of interconnectors 200/220 in manners similar to those described above (e.g., the discussion of release aid 85 for FIGS. 1-6), and then dry firing strength trainer 7. Alternative implementations may utilize a fixed aid (not shown) akin to release aid 85, except that the fixed aid does not release from loops 210/230 as strength resistance band 242 is extended and distended during dry fire practicing for strength building. In some implementations, adjustable interconnector(s) 220 may couple with bottom distal section 246 and/or top distal section 244. In implementations utilizing at least one adjustable interconnector 220, the resistance value of strength resistance band 242 can be increased by adjusting the location of adjustable interconnector 220 axially to shorten strength resistance band 242 (or decreasing the resistance value by lengthening band 242 by moving interconnector 220). Adjusting the length can adjust the resistance by some degree because of progressive resistance of bands.

FIGS. 32-36 illustrate various views and implementations of an archery release aid configured to mimic the finger positioning of a traditional bow, and is designated a finger release aid 250. Finger release aid 250 may comprise body 251 fixedly attached to a proximate portion of nock 252, where body 251 also includes: a top arm 257 having a distal portion fixedly attached to a top string 253, and a bottom arm 258 having a distal portion fixedly attached to a bottom string 254, such that the distal portion of nock 252 fixedly attaches to both top string 253 and bottom string 254 in the area between top arm 257 and bottom arm 258. Top string 253 and bottom string 254 are constructed to mimic the feel of shooting a traditional bow (rather than a compound bow) with fingers placed on a bow string above and below a nock from an actual arrow. For example, FIGS. 35 and 36 depict the user's fingers placed on top and bottom string 253 and 254 of finger release aid 250 to mimic the feel of shooting a traditional bow during dry firing. In some implementations top string 253 and bottom string 254 are one continual string that passes through a hole or nock at the distal portion of nock 252 and is secured to top arm 257 and bottom arm 258 (e.g., being tied off or frayed and melted after passing through holes), and may be, for example a commercially available bow string such as a preferred bow string of the user. In some implementations, nock 252 has at least two vertical holes (not shown) configured to allow string 253/254 to pass there through at different points along the axis of nock 252 and thereby allowing the user to adjust the angles of string 253/254 according to draw length and preference. In other implementations, nock 252 may have an additional sleeve or other component that slidably moves along nock 252.

Figure 37:
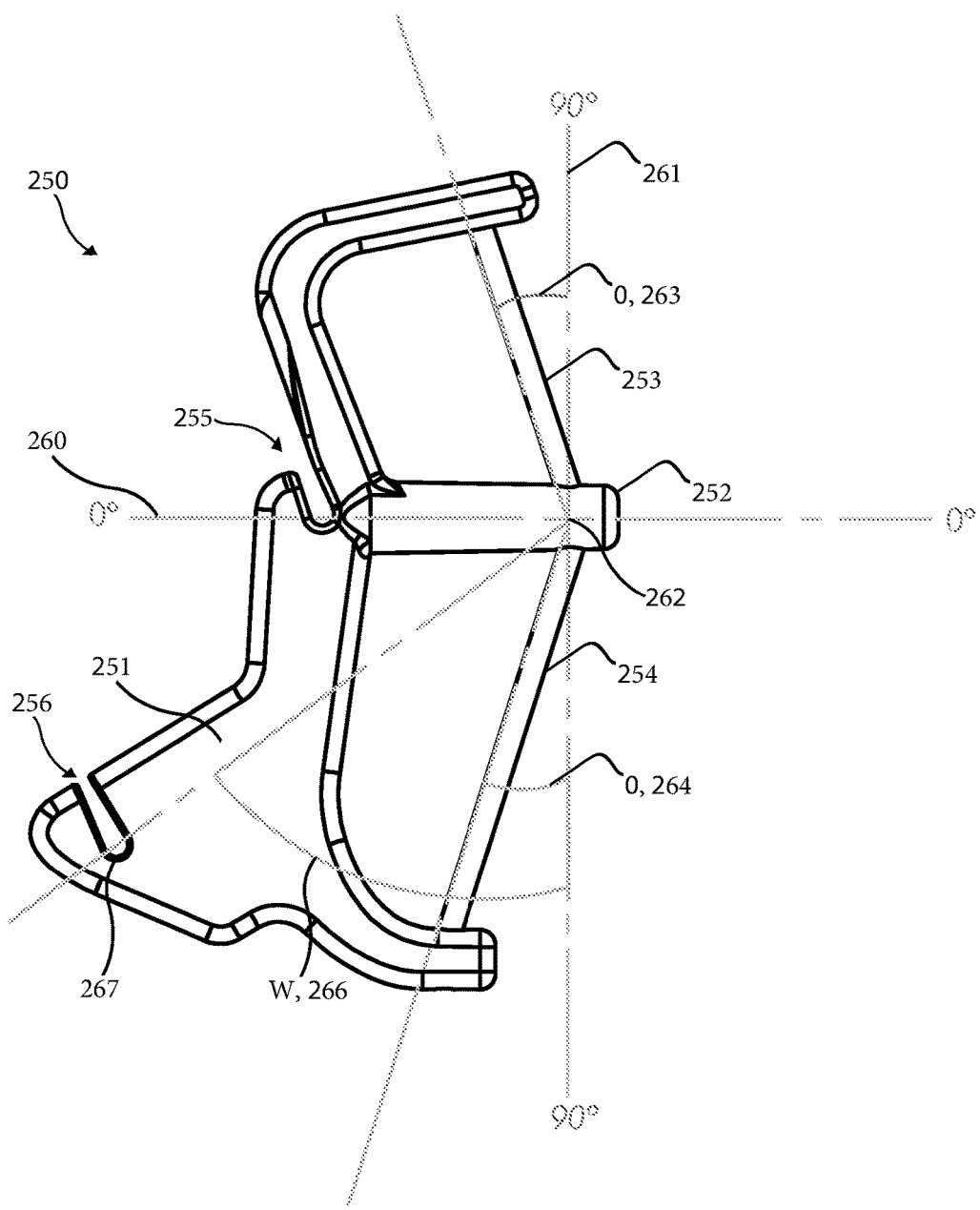

FIG. 37 depicts angles between various elements of the finger release aid 250. Finger release aid 250 is constructed to mimic the actual angles of a bowstring near an arrow's nock and to promote proper shooting form by the placement and shape of bottom slit 256 and/or top slit 255. FIG. 37 shows exemplary angles for constructing finger release aid 250. Finger release aid 250 is depicted with the axis of nock 252 set along x-axis 260, with y-axis 261 intersecting x-axis 260 at the point an arrow's nock would press against a bow string, which is denoted as origin 262. Angle θ (theta) 263 is the angle between y-axis 261 and top string 253, and may have an angle of approximately: 5° to 40°, 17° to 33°, 17° to 23°, or 19° to 21°. Angle φ (phi) 264 is the angle between y-axis 261 and bottom string 254, and may have an angle of approximately: 5° to 40°, 13° to 27°, 13° to 19°, or 15° to 17°. Angle ω (omega) 266 is the angle between y-axis 261 and depth 267 of bottom slit 256, and may have an angle of approximately: 40° to 70°, 50° to 60°, or 53° to 57°. In some implementations, angle θ (theta) 263 is approximately 20°, angle φ (phi) 264 is approximately 16°, and angle ω (omega) 266 is approximately 55°. In certain implementations angle θ (theta) 263 and angle φ (phi) 264 approximately correspond to the user's draw length such that an increased draw length results in increases in one or both of angle θ (theta) 263 and angle φ (phi) 264.

Referring to FIGS. 32-37, body 251 includes a top slit 255 positioned near nock 252 and configured to releasably couple with top interconnector 91, and also includes a bottom slit 256 positioned in the bottom region of body 251 and configured to releasably couple with bottom interconnector 93. As with some implementations of release aid 85 and electronic release aid 130, finger release aid 250 is designed in some implementations to couple with top resistance band 90, which provides the primary tension, and bottom resistance band 92, which provides counterbalance tension to better mimic the feeling of an actual bow. The shape and position within body 251 of top slit 255 and bottom slit 256 are specifically designed to teach the user proper form by sloping bottom slit 256 and/or top slit 255 such that the coupled interconnector 91/93 will slip out if the user tilts finger release aid 250 too much in a clockwise or counterclockwise direction (i.e., tilting around origin 262 of FIG. 37). For example, certain implementations shape top slit 255 so that top interconnector 91 will slip out when finger release aid 250 is tilted counterclockwise too much, but bottom slit 256 is more narrowly shaped so that bottom interconnector 93 does not slip out of bottom slit 256 and remains inserted even after top interconnector 91 has slipped out of top slit 255.

A wide variety of materials may be used to construct finger release aid 250. Body 251 and nock 252 may be constructed of plastic, metal, wood, or any other rigid material. Top string 253 and bottom string 254 may be constructed of a rigid material (e.g., metal, some plastics, etc.) or a flexible material (e.g., some plastics, natural or synthetic fibers, bow strings, etc.). Nock 252 may be generally cylindrical in shape to mimic the look and feel of the end of an arrow shaft and the shaft's nock, and may have a diameter of about ¼" at the proximate portion of nock 252 (coupled to body 251) and then taper down to a diameter of about ⅜" at the distal portion of nock 252 (coupled to strings 253 and 254).

Referring still to FIGS. 32-37, the user may dry fire any one of archery training systems 1, 3, 5, or, 7 using finger release aid 250. The user's index finger may contact top string 253 (e.g., between the first and second knuckles) just above the nock 252. The user's third and fourth fingers (i.e., middle and ring fingers) may contact bottom string 254 (e.g., between the first and second knuckles) just below the nock 252. The user's index finger may press in a downward motion in opposition to the upper pressure applied by the user's third and fourth fingers, thereby squeezing the nock 252 in a manner akin to shooting an actual arrow. See FIGS. 35 and 36 for a depiction of this implementation. Finger placement may vary depending on the user's preference. For instance, training of new archers may include the index, third, and fourth fingers all being placed below the nock 252 with each finger wrapping around the string and keeping the string between the first and second knuckles.

During dry firing with the finger release aid 130, the shape and position of one or both of top slit 255 and bottom slit 256 play an important role in training the user how to use proper form when firing a traditional bow. Thus, top slit 255 and/or bottom slit 256 are formed to promote proper form by keeping nock 252 perpendicular to the user's sagittal plane (assuming the user is standing on a flat surface and shooting parallel to the ground surface). If the user fails to use proper form, at least one interconnector 91/93 will slip out of slits 255/256. These mechanics provide instant feedback to the user concerning poor finger shooting form and identify bad habits that need correction. Proper form includes keeping the nock 252 parallel to the ground and perpendicular to the sagittal plane of the user as described above, and may also include equal rearward force being applied to both the top string 253 and bottom string 254 during rearward draw and at a full draw hold position.

Specific to the individual user's preference, when the user is ready to release the finger release aid 250 at full rearward draw, the user relaxes the gripping fingers allowing finger release aid 250 to retract towards the handle structure 10 as resistance bands 90 and 92 return to their original positions of rest. In some implementations, the tension of top resistance band 90 will cause the finger release aid 250 to rotate away from the user (counterclockwise) towards the handle structure 10, thereby causing top interconnector 91 to slip out of top slit 255 safely away from the user.

Thus, dry firing with finger release aid 250 may mimic the actions of finger shooting an arrow while using a traditional archery bow. Again, this provides instant feedback for users that have maintained proper form during the draw, hold and release phases used during finger shooting.

FIGS. 38-47 illustrate various views and implementations of a stabilizer 280 added to an archery training system 1. Stabilizer 280 may also be implemented with electronic training system 3, motorized tensioner training system 5, archery strength trainer 7, or other archery training systems discussed herein. Stabilizer 280 may couple with handle structure 10 at stabilizer connector 45 using stabilizer insert 52. Stabilizer 280 may comprise a stabilizer bracket 282, at least one weight 290, and locking bolt 292.

Figures 46, 47:
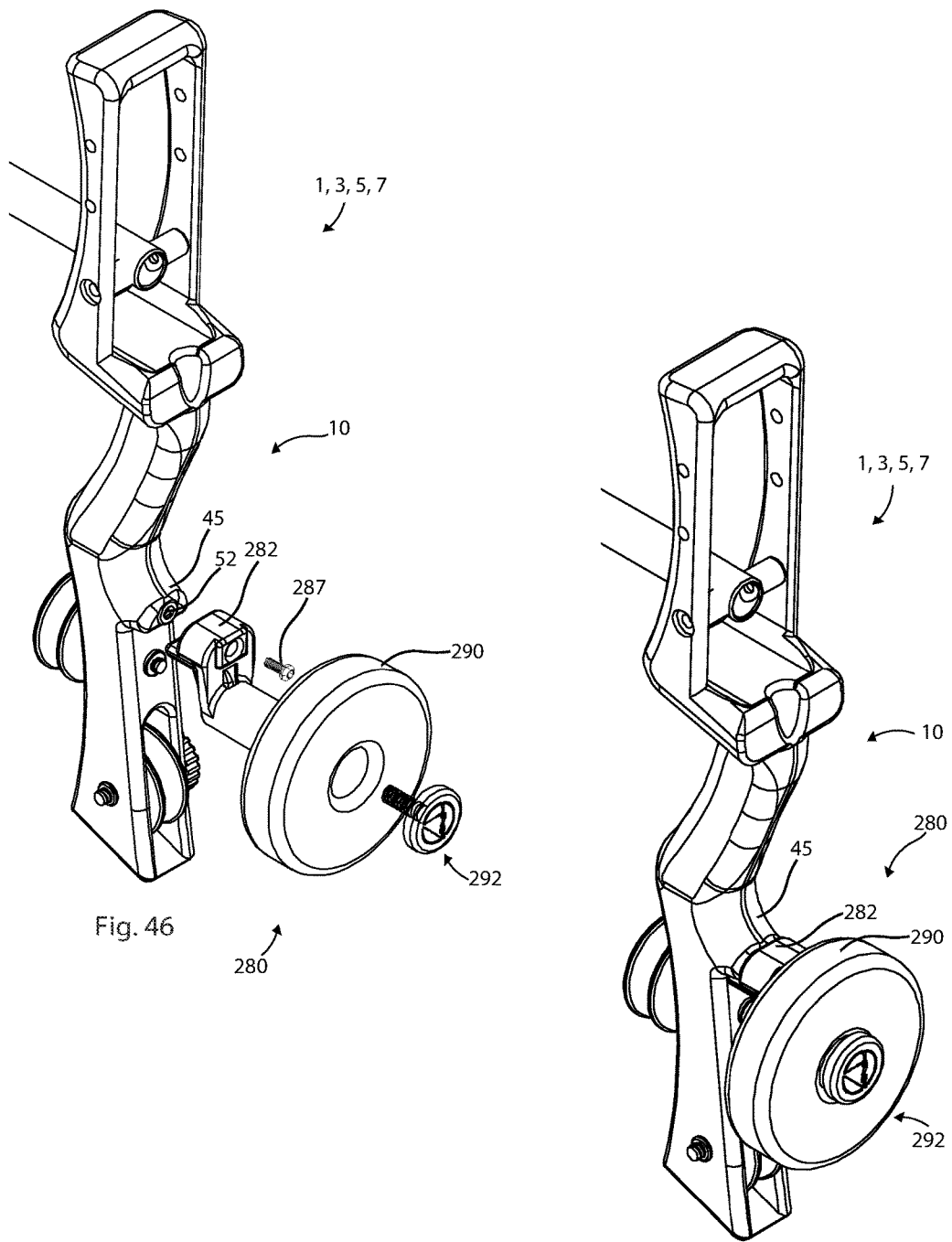
FIG. 46 is a front perspective exploded view of a handle structure coupled with a stabilizer according to the implementations of FIG. 38.
FIG. 47 is a front perspective view of a handle structure coupled with a stabilizer according to the implementations of FIG. 38.

FIG. 38 is a rear perspective exploded view of a stabilizer 280. FIG. 39 is a side exploded view of a stabilizer 280. FIG. 40 is a rear perspective view of a stabilizer bracket 282 of stabilizer 280. FIG. 41 is a side view of a stabilizer bracket 282. FIG. 42 is a front perspective view of a stabilizer bracket 282. FIG. 43 is a front view of a stabilizer bracket 282. FIG. 44 is a side exploded view of stabilizer 280 coupled to stabilizer connector 45 of handle structure 10. FIG. 45 is a side view of stabilizer 280 coupled to handle structure 10. FIG. 46 is a front perspective exploded view of stabilizer 280 coupled to handle structure 10. FIG. 47 is a front perspective view of stabilizer 280 coupled to handle structure 10.

Stabilizer 280 may, for example, improve archery training system 1 performance in one or more of the following ways: reducing torque, moving the center of gravity, improving the moment of inertia, helping to keep the archery training system 1 steady when dry firing, dampening vibrations, and reducing hand shock. Stabilizer 280 may include a stabilizer bracket 282 adapted to releasably couple with a weight 290 by sliding weight 290 onto weight mount 284 and coupling locking bolt 292 to threaded locking bolt hole 288. Stabilizer bracket 282 may include a bracket mount 283 adapted to couple with stabilizer connector 45 by coupling bolt 287 to bracket hole 286 and threaded stabilizer insert 52. Stabilizer bracket 282 may include a flexible bracket damper 285 that flexibly exerts a force against handle structure 10 to dampen movement of stabilizer 280. In some implementations, the head of locking bolt 292 contains a decoration 293, such as decal or etching of a symbol or other product-identifying mark.

It will be understood that archery training system implementations (e.g., training systems 1, 3, 5, and 7) are not limited to the specific assemblies, devices and components disclosed in this document, as virtually any assemblies, devices and components consistent with the intended operation of an archery training system implementation may be utilized. Accordingly, for example, although particular assemblies, devices and components are disclosed, such may comprise any shape, size, style, type, model, version, class, measurement, concentration, material, weight, quantity, and/or the like consistent with the intended operation of an archery training system implementation. Implementations are not limited to uses of any specific assemblies, devices and components; provided that the assemblies, devices and components selected are consistent with the intended operation of an archery training system implementation.

Accordingly, the components defining any archery training system implementation may be formed of any of many different types of materials or combinations thereof that can readily be formed into shaped objects provided that the components selected are consistent with the intended operation of an archery training system implementation. For example, the components may be formed of: polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; glasses (such as quartz glass), carbon-fiber, aramid-fiber, any combination thereof, and/or other like materials; composites and/or other like materials; metals, such as zinc, magnesium, titanium, copper, lead, iron, steel, carbon steel, alloy steel, tool steel, stainless steel, brass, tin, antimony, pure aluminum, 1100 aluminum, aluminum alloy, any combination thereof, and/or other like materials; alloys, such as aluminum alloy, titanium alloy, magnesium alloy, copper alloy, any combination thereof, and/or other like materials; any other suitable material; and/or any combination of the foregoing thereof.

Various archery training system implementations may be manufactured using conventional procedures as added to and improved upon through the procedures described here. Some components may be manufactured simultaneously and integrally joined with one another, while other components may be purchased pre-manufactured or manufactured separately and then assembled with the integral components.

Accordingly, manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g., a bolt, a nut, a screw, a nail, a rivet, a pin, and/or the like), wiring, any combination thereof, and/or the like for example, depending on, among other considerations, the particular material forming the components.

Upon reading the teachings of this specification, those with ordinary skill in the art will appreciate that, under certain circumstances, considering issues such as changes in technology, user requirements, etc., a variety of fastening devices may be used to "affix", "couple", and/or "releasably couple" (as those words are used herein) one or more components of the present disclosure. These fastening devices may include one or more of the following: adhesives, bolts, buckles, clasps, latches, locks, screws, snaps, clamps, connectors, couplings, ties, or other fastening means yet to be developed.

Likewise, upon reading the teachings of this specification, those with ordinary skill in the art will appreciate that, under certain circumstances, considering issues such as changes in technology, subject requirements, etc., a variety of fastening devices, such as adhesives, belts, bolts, buckles, clasps, latches, locks, screws, snaps, clamps, connectors, couplings, ties or other fastening means yet to be developed may be used in lieu of—or in conjunction with—any of the fasteners or fastening means discussed above.

It will be understood that the assembly of archery training system implementations are not limited to the specific order of steps as disclosed in this document. Any steps or sequence of steps of the assembly of mechanical release archery training system implementations indicated herein are given as examples of possible steps or sequence of steps and not as limitations, since various assembly processes and sequences of steps may be used to assemble archery training system implementations.

In places where the description above refers to particular implementations, it should be readily apparent that a number of modifications may be made without departing from the spirit thereof and that these implementations may be applied to other implementations disclosed or undisclosed. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

Further implementations are within the claims.

The invention claimed is:

1. An archery training system comprising:
    a training device having a handle, the training device having a long axis that intersects the handle;
    a first adjustable tensioner attached to the training device comprising a spool; and
    a first elastic resistance band coupled to the spool of the first adjustable tensioner and coupled to a first interconnector;
    whereby the first interconnector is capable of being operatively engaged by a release aid held in a user's shooting hand, permitting the user to draw apart the first elastic resistance band and the handle held in the user's non-shooting hand and fire the archery training device.

2. The training system of claim 1, wherein the spool of the first adjustable tensioner defines a slot therein that receives an end of the first elastic resistance band.

3. The training system of claim 1, wherein an end of the first elastic resistance band is coupled to the spool of the first adjustable tensioner by a fastener.

4. The training system of claim 3, wherein the fastener is one of a screw, a compression plate and screws, an adhesive, and a knot.

5. The training system of claim 1, the first adjustable tensioner further comprising an adjustment knob coupled to the spool.

6. The training system of claim 1, wherein the first elastic resistance band and the first adjustable tensioner are operable together to adjust a tension for the first elastic resistance band to at least one value between 1 and 70 pounds.

7. The training system of claim 6, wherein the tension is increased by adjusting the first adjustable tensioner in a first direction and the tension is decreased by adjusting the first adjustable tensioner in a second direction.

8. The training system of claim 1, the first adjustable tensioner further comprising a locking pin that locks a position of the first adjustable tensioner.

9. The training system of claim 1, wherein the first interconnector comprises a loop, ring, rope, string, cable, or wire capable of being operatively engaged by the release aid.

10. The training system of claim 1, wherein the first interconnector is adjustably positioned along a portion of the first elastic resistance band.

11. The training system of claim 1, further comprising a second elastic resistance band configured to couple to at least one of a second interconnector, the first elastic resistance band, the first interconnector, or the release aid.

12. The training system of claim 11, further comprising a second adjustable tensioner attached to the training shaft and coupled to the second elastic resistance band.

13. An archery training system comprising:
    a training device having a handle, the training device having a long axis that intersects the handle;
    a first tensioner attached to the training device comprising a spool and an adjustment knob coupled to the spool; and
    a first resistance band coupled to the spool of the first tensioner.

14. The training system of claim 13, wherein the first resistance band is further coupled to a first interconnector, whereby the first interconnector is capable of being operatively engaged by a release aid held in a user's shooting hand, permitting the user to draw apart the first resistance band and the handle held in the user's non-shooting hand and fire the archery training device.

15. The training system of claim 13, wherein the first resistance band and the first tensioner are operable together to adjust a tension for the first resistance band to at least one value between 1 and 70 pounds.

16. The training system of claim 15, wherein the tension is increased by adjusting the adjustment knob in a first direction and the tension is decreased by adjusting the adjustment knob in a second direction.

17. The training system of claim 13, wherein the spool of the first tensioner comprises a slot that receives an end of the first resistance band.

18. The training system of claim 13, wherein the first interconnector comprises a loop, ring, rope, string, cable, or wire capable of being operatively engaged by the release aid.

19. The training system of claim 13, wherein the first interconnector is adjustably positioned along a portion of the first resistance band.

20. The training system of claim 13, the first adjustable tensioner further comprising a locking pin that locks a position of the first adjustable tensioner.

* * * * *

UNITED STATES PATENT AND TRADEMARK OFFICE
CERTIFICATE OF CORRECTION

PATENT NO. : 10,260,836 B1
APPLICATION NO. : 15/495754
DATED : April 16, 2019
INVENTOR(S) : Justin Tafoya It is certified that error appears in the above-identified patent and that said Letters Patent is hereby corrected as shown below:

In the Specification

Column 18, Line 62 reads "femail" It should read: - female -

Signed and Sealed this
Twenty-third Day of June, 2020

Andrei Iancu
*Director of the United States Patent and Trademark Office*